US008440876B2

(12) United States Patent
Enda et al.

(10) Patent No.: US 8,440,876 B2
(45) Date of Patent: May 14, 2013

(54) CHEMICAL DECONTAMINATION APPARATUS AND DECONTAMINATION METHOD THEREIN

(75) Inventors: Masami Enda, Yokohama (JP); Nagayoshi Ichikawa, Kawasaki (JP); Masayuki Kaneda, Yokohama (JP); Takeshi Kanasaki, Yokosuka (JP); Toshihiro Yoshii, Sagamihara (JP); Yumi Yaita, Katsushika (JP); Ichiro Inami, Bunkyo-Ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 12/278,864

(22) PCT Filed: Feb. 6, 2007

(86) PCT No.: PCT/JP2007/052028
§ 371 (c)(1), (2), (4) Date: Aug. 8, 2008

(87) PCT Pub. No.: WO2007/091559
PCT Pub. Date: Aug. 16, 2007

(65) Prior Publication Data
US 2010/0168497 A1 Jul. 1, 2010

(30) Foreign Application Priority Data
Feb. 9, 2006 (JP) ................................ 2006-032575
Feb. 28, 2006 (JP) ................................ 2006-053698

(51) Int. Cl.
*G21F 9/00* (2006.01)
*C02C 23/00* (2006.01)
*B08B 9/00* (2006.01)
*B08B 3/00* (2006.01)
*B09B 7/00* (2006.01)
*B01J 19/08* (2006.01)

(52) U.S. Cl.
USPC .......... 588/1; 134/2; 134/22; 134/19; 134/47; 134/131; 422/186.102; 422/186.08

(58) Field of Classification Search ........................ None
See application file for complete search history.

(56) References Cited

U.S. PATENT DOCUMENTS 4,287,002 A 9/1981 Torok
4,557,890 A * 12/1985 Matsuda et al. .............. 376/282
(Continued)

FOREIGN PATENT DOCUMENTS

JP 7-140296 6/1995
JP 9-159798 6/1997
(Continued)

OTHER PUBLICATIONS

U.S. Appl. No. 11/443,106, filed May 31, 2006, Enda, et al.

*Primary Examiner* — Melvin C Mayes
*Assistant Examiner* — Sheng H Davis
(74) *Attorney, Agent, or Firm* — Oblon, Spivak, McClelland, Maier & Neustadt, L.L.P.

(57) ABSTRACT

A chemical decontamination apparatus of the present invention chemically dissolves radioactive substance-containing oxide films formed or adhering on the surface of a decontamination object by using ozone water to conduct decontamination. The chemical decontamination apparatus includes an ozone generating unit for generating ozone gas, an ozone supplying device for supplying the generated ozone gas to an ozone supplying unit in water, and a sintered metal element 37 which is disposed in the ozone supplying unit and to which ozone gas is supplied from the ozone supplying device. The ozone gas supplied to a sintered metal element interior from the ozone supplying device is allowed to flow out of the element into water so as to generate ozone water.

20 Claims, 10 Drawing Sheets

U.S. PATENT DOCUMENTS

| | | | | |
|---|---|---|---|---|
| 4,756,768 | A | 7/1988 | Bertholdt et al. | |
| 5,070,589 | A * | 12/1991 | Howell et al. | 29/426.5 |
| 5,868,999 | A * | 2/1999 | Karlson | 422/30 |
| 6,171,551 | B1 * | 1/2001 | Malchesky et al. | 422/29 |
| 6,506,955 | B1 * | 1/2003 | Wilson et al. | 588/1 |
| 7,087,120 | B1 | 8/2006 | Enda et al. | |
| 2004/0035443 | A1 * | 2/2004 | Yaita et al. | 134/2 |
| 2007/0071654 | A1 | 3/2007 | Enda et al. | |

FOREIGN PATENT DOCUMENTS

| | | | |
|---|---|---|---|
| JP | 2000 81498 | | 3/2000 |
| JP | 2000-81498 | | 3/2000 |
| JP | 2002 228796 | | 8/2002 |
| JP | 2002-250794 | | 9/2002 |
| JP | 2002 250794 | | 9/2002 |
| JP | 2002 361269 | | 12/2002 |
| JP | 2002346579 | * | 12/2002 |
| JP | 2003 98294 | | 4/2003 |
| JP | 2003285085 | * | 10/2003 |
| JP | 2004 191259 | | 7/2004 |
| KR | 2001038518 | * | 5/2001 |
| WO | 2006131148 | * | 12/2006 |

* cited by examiner

CHEMICAL DECONTAMINATION APPARATUS AND DECONTAMINATION METHOD THEREIN

CROSS REFERENCE TO RELATED APPLICATION

This application is a 371 of PCT/JP07/052,028, filed on Feb. 6, 2007, and claims priority to the following Japanese Patent Applications: JP 2006-032575 filed on Feb. 9, 2006, and JP 2006-053698, filed on Feb. 28, 2006.

TECHNICAL FIELD

The present invention relates to a chemical decontamination technique using ozone. In particular, it relates to a chemical decontamination apparatus that performs decontamination by chemically dissolving oxide films adhering or formed on surfaces of decontamination objects, e.g., reactor structural materials in a reactor primary system, such as reactor equipment, piping, and the like, and also relates to a chemical decontamination decontamination method.

Background Art

Many patent applications related to chemical decontamination techniques that use ozone have been filed. Chemical decontamination techniques are being employed in chemical decontamination operation of actual reactors.

Patent Document 1 (Japanese Unexamined Patent Application Publication No. 2000-81498) describes a chemical decontamination technique in which the pH of ozone water is controlled to 5 or less to increase the dissolved ozone concentration. Patent Document 2 (Japanese Unexamined Patent Application Publication No. 2002-250794) discloses a chemical decontamination technique that suppresses corrosion of reactor structural materials by adding to ozone water at least one oxidation auxiliary agent (aid) selected from the group consisting of carbonic acid, a carbonate, boric acid, a borate, sulfuric acid, a sulfate, phosphoric acid, and a phosphate. Patent Document 3 (Japanese Unexamined Patent Application Publication No. 2002-228796) describes a chemical decontamination technique that uses ozone, in which ozone gas is supplied through a multitubular hollow fiber membrane mixer so as to efficiently dissolve the ozone gas in water.

The chemical decontamination technique described in Patent Document 1 involves adding nitric acid to water, forming ozone water having a pH of 5 or less, and performing oxidation treatment in the resulting pH aqueous solution to dissolve the oxide films and conduct chemical decontamination. However, because the oxidation auxiliary agent added to water is nitric acid, the oxidizing power of the ozone aqueous solution is weak, and corrosion of the reactor structural materials by ozone water cannot be suppressed, which is problematic.

Patent Document 2 describes a technique of adding phosphoric acid as the oxidation auxiliary agent in order to suppress corrosion of the reactor structural materials. However, because phosphoric acid is close to a weak acid, addition of phosphoric acid as the oxidation auxiliary agent yields only small oxidation power and cannot efficiently and effectively suppress corrosion of the reactor structural materials.

In order to yield a large oxidation power by adding phosphoric acid as the oxidation auxiliary agent, a large quantity of phosphoric acid must be added. As a result, large quantities of secondary wastes are produced after decontamination and a new problem arises in that disposal of the secondary wastes requires much labor and cost.

The chemical decontamination technique that uses a multitubular hollow fiber membrane mixer described in Patent Document 3 has a drawback. That is, because the multitubular hollow fiber membrane mixer is made of a resin, it is easily damaged.

In a nuclear power plant, the reactor equipment and various piping are made of steel materials such as stainless steel, carbon steel, and the like. The reactor equipment and piping inner surfaces undergo corrosion as they contact high-temperature water and oxide films are formed thereon. Radioactivity in the reactor water is trapped in the oxide films adhering on the wetted portions of the reactor equipment and piping inner surfaces exposed to the high-temperature water, and the oxide films become exposure sources.

The oxide films formed on the wetted portions of the reactor equipment and various piping inner surfaces are chemically dissolved and removed by a chemical decontamination technique. This chemical decontamination technique is a radioactivity removal technique involving chemical dissolution of the oxide films and is suitable for chemical decontamination of decontamination objects having complex shapes and components that are difficult to uninstall and are reused after decontamination. Many techniques employing chemical decontamination have been reported in recent years.

In the chemical decontamination, a decontamination agent that dissolves iron oxides is used in combination with an oxidant that dissolves chromium oxides to enhance decontamination effects. As the oxidant, permanganic acid, a potassium permanganate solution, ozone water, or the like is used. In the case of ozone water, due to ozone's high self-decomposability, ozone water must be constantly supplied.

In the case where the decontamination object has a large scale, such as in the case of internal decontamination of the reactor primary system, ozone's self-decomposability may lead to a decrease in ozone concentration during circulation and insufficient decontamination effects. There has been a report that the ozone concentration required for decontamination is 1 ppm or more.

An example of a method for efficiently injecting ozone in order to decontaminate the metal surfaces of the decontamination objects of reactor-related facilities is disclosed in, for example, Patent Document 4 (Japanese Unexamined Patent Application Publication No. 2003-98294) in which ozone is injected into the inlet of a recirculation pump of a reactor recirculation system. An example of a method for efficiently mixing gas into water is disclosed in, for example, Patent Document 5 (Japanese Unexamined Patent Application Publication No. 2005-34760) in which an ejector is used so that the gas is sucked into the ejector and then mixed. A technique of injecting ozone in a downstream flow so as to dissolve the ozone in water is disclosed in, for example, Patent Document 6 (Japanese Unexamined Patent Application Publication No. 8-192176).

A technique using an ion exchange resin in a chemical cleaning apparatus for reactor structures to remove radioactive contaminants from the reactor structures is disclosed in, for example, Patent Document 7 (Japanese Unexamined Patent Application Publication No. 2001-91692).

In a nuclear power plant, the temperature of the water circulating in the decontamination objects such as reactor equipment and various piping is high. The decontamination temperature is usually 70° C. or more. Since the decontamination water is a gas-liquid mixed flow of water and ozone, ozone injection to the pump upstream side of the reactor recirculation pump may cause pump cavitation in the pump unit of the recirculation pump and may thereby damage the pump.

As in the gas-dissolving apparatus described in Patent Document 5, application of a technique that uses an ejector to incore chemical decontamination apparatuses for reactors and decontamination methods therefor causes delay of work for installing an ejector in the reactor or an interference problem with the reactor structures. Thus, implementation of this technique is difficult.

In order to simplify and facilitate installation of the ejector, a temporary circulation loop is formed and the ejector is installed in the temporary circulation loop. However, in the case of internal decontamination of the reactor primary system, the overall system volume is large. Thus, the concentration of ozone must be high, and it is difficult to securely obtain and maintain a sufficient ozone concentration.

Furthermore, a technique of diffusing ozone in the downstream flow is also available as described in Patent Document 6, but it is difficult to apply this ozone diffusion method to the incore chemical decontamination apparatus for a reactor. In the reactor, the annulus portion (downcomer portion) in the gap between the reactor pressure vessel and the shroud where the internal downstream flow is generated is located at least several meters, e.g., about 6 m, down from the upper flange. Thus, an ozone injecting jig that can withstand large quantities, e.g., 1600 $m^3$/h, of internal flow and burst of gas is necessary.

The chemical decontamination apparatus of the reactor structures described in Patent Document 7 needs a backwash-type filter apparatus or a large-scale ion exchange resin tower to remove the radioactive contamination. Hence, the apparatus becomes complicated.

The inventors of the present invention have found, from the repeated experiments of the chemical decontamination techniques, that in the chemical decontamination technique using ozone, sufficient decontamination performance is achieved if the pH of ozone water is 3 or less and that the decontamination performance is significantly deteriorated at a pH exceeding 3.

DISCLOSURE OF THE INVENTION

Under the circumstances described above, an object of the present invention is to provide a high-performance chemical decontamination apparatus that uses ozone, exhibits improved oxide film decomposition performance and decontamination performance, and improves decontamination performance while maintaining the soundness of the decontamination object, and also to provide a decontamination method for the apparatus.

Another object of the present invention is to provide a chemical decontamination apparatus in which the ozone water satisfies the condition that the pH is 3 or less, the additives for suppressing corrosion of the decontamination objects such as reactor structural materials and the like are optimized, corrosion of the decontamination objects can be efficiently and effectively suppressed, and the decontamination and cleaning effects can be enhanced, and also provide a decontamination method for the apparatus.

Still another object of the present invention is to provide an incore chemical decontamination apparatus in which ozone gas is stably supplied to obtain ozone water with an adequate ozone concentration, the decontamination efficiency is enhanced, an ozone diffusion pipe that can withstand the internal flow is stably disposed in the upper part of an annulus portion, the adequate ozone concentration is obtained by continuously and stably injecting ozone gas, and the decontamination efficiency is improved due to the installation position of the ozone diffusion pipe, and also provide a decontamination method for the apparatus.

To overcome the problems described above, the present invention provides a chemical decontamination apparatus for chemically dissolving in ozone water a radioactive substance-containing oxide film formed or adhering on a surface of a decontamination object to carry out decontamination, including:

an ozone generating unit for generating ozone gas;

an ozone supplying device for supplying the generated ozone gas to an ozone supplying unit in water; and a sintered metal element which is disposed in the ozone supplying unit and to which ozone gas is supplied from the ozone supplying device, wherein the ozone gas supplied to a sintered metal element interior from the ozone supplying device is allowed to flow out of the element into water so as to generate ozone water.

To overcome the problems described above, the present invention provides a chemical decontamination apparatus that chemically decontaminates an interior of a reactor pressure vessel or a reactor primary system by providing a core shroud in the reactor pressure vessel, providing a jet pump in a downcomer portion formed between the core shroud and a reactor pressure vessel, and providing a reactor recirculation system for recirculating water of the reactor pressure vessel so as to produce a flow in water in the reactor pressure vessel by operating a recirculation pump of the reactor recirculation system, the chemical decontamination apparatus including:

an ozone generating unit for generating ozone gas;

an ozone supplying device for supplying the generated ozone gas to near an inlet of the jet pump or to an ozone supplying unit inside recirculation piping of the reactor recirculation system; and a sintered metal element which is disposed in the ozone supplying unit, wherein the ozone gas supplied to a sintered metal element interior from the ozone supplying device is allowed to flow out of the element into water so as to generate ozone water.

To overcome the problems described above, the present invention provides a chemical decontamination method in which, when a radioactive substance-containing oxide film formed or adhering on a surface of a decontamination object is chemically dissolved with ozone water to conduct decontamination, the ozone water is used as a decontamination solution and the ozone water is used to chemically dissolve the oxide film on the decontamination object to conduct decontamination, the method including the steps of:

adding to water an oxidation auxiliary agent that suppresses matrix corrosion of the decontamination object and a pH adjustor that increases the dissolved ozone concentration in the decontamination solution; and subsequently dissolving ozone gas in water so as to produce ozone water.

To overcome the problems described above, the present invention provides a chemical decontamination method for chemically decontaminating a reactor pressure vessel and a reactor primary system with ozone by providing a jet pump for forcibly circulating reactor water in a downcomer portion between the reactor pressure vessel and a core shroud disposed inside the reactor pressure vessel and recirculating the reactor water from the jet pump by operating a recirculation pump of a reactor recirculation system so as to produce a flow in ozone water, the method including:

supplying ozone gas to near an inlet of the jet pump or to an inside of a recirculation piping of the reactor recirculation system, and supplying the generated ozone gas to water to which the oxidation auxiliary agent and the pH adjustor are added so as to produce ozone water.

To overcome the problems described above, the present invention provides an incore chemical decontamination apparatus for chemically decontaminating a decontamination object of a reactor primary system by using an organic acid as a reductant and ozone water as an oxidant, including:

a decontamination solution supplying device for supplying a decontamination solution to a reactor interior of the reactor primary system;

an ozone supplying device for injecting ozone gas to the reactor interior of the reactor primary system;

an ozone water generating unit for generating ozone water with injected ozone gas; and an ozone water circulating unit for circulating the generated ozone gas in the reactor primary system, wherein the ozone supplying device includes an ozone diffusion pipe for diffusing the ozone gas, the ozone diffusion pipe being provided at an inlet side of the ozone water generating unit.

To overcome the problems described above, the present invention provides an incore chemical decontamination method for chemically decontaminating a decontamination object of a reactor primary system by using an organic acid as a reductant and ozone water as an oxidant, wherein, a reactor recirculation system is driven by pump to generate flow of circulation water in the reactor recirculation system and a reactor interior, and ozone gas is injected from an ozone diffusion pipe disposed in an upper portion of a reactor internal annulus portion, the injected ozone gas is supplied to the circulation water to generate ozone water containing dissolved ozone, and a decontamination solution supplied in a reactor by decontamination solution supplying device is combined with ozone water containing dissolved ozone to chemically decontaminate the decontamination object of the reactor primary system.

According to preferred embodiments of the chemical decontamination apparatus and the decontamination method of the present invention described above, oxide films can be dissolved and the decontamination performance can be enhanced while retaining the soundness of the decontamination object.

According to another preferred embodiment of the chemical decontamination apparatus and the decontamination method of the present invention, the ozone water satisfies the condition that the pH is 3 or less, the additives for suppressing corrosion of the decontamination objects such as reactor structural materials and the like can be optimized, corrosion of the decontamination objects can be efficiently and effectively suppressed, and the decontamination and cleaning effects can be enhanced.

According to a further preferred embodiment of the chemical decontamination apparatus and the decontamination method of the present invention, ozone gas is stably supplied to obtain ozone water with an adequate ozone concentration, the decontamination efficiency is enhanced, an ozone diffusion pipe that can withstand the internal flow is stably disposed in the upper part of an annulus portion, the adequate ozone concentration is obtained by continuously and stably injecting ozone gas, and the decontamination efficiency is improved due to the installation position of the ozone diffusion pipe.

BRIEF DESCRIPTION OF DRAWINGS

FIG. 11 FIG. 11A and FIG. 11B are diagrams schematically showing measurement positions inside the reactor at which the ozone concentration is measured.

In FIG. 11:

Figure 1:
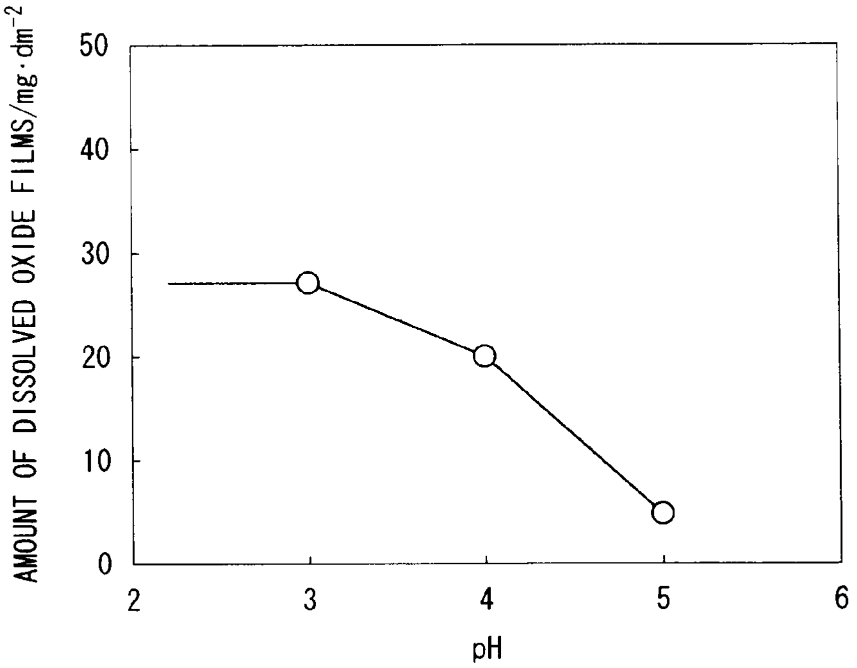
FIG. 1 A graph showing a relationship between an amount of dissolved oxide films and pH in a chemical decontamination method using ozone according to a first embodiment of the present invention.

b: ozone concentration at nozzle inlet,
c: ozone concentration at nozzle inlet,
d: ozone concentration at nozzle inlet,
e: ozone concentration at nozzle inlet,
f: ozone concentration at nozzle inlet,
g: ozone concentration at reactor recirculation system outlet nozzle,
h: ozone concentration at pump outlet,
i: ozone concentration at pump outlet,
j: ozone concentration at pump outlet,
k: ozone concentration at pump outlet,
l: ozone concentration at pump outlet

BEST MODES FOR CARRYING OUT THE INVENTION

The embodiments of the chemical decontamination apparatus of the present invention will now be described with reference to the attached drawings.

The chemical decontamination apparatus of the present invention uses ozone water having a pH of 3 or less to conduct chemical decontamination by efficiently decomposing oxide films containing radioactive substances adhering on surfaces of decontamination objects, for example, reactor structural materials, and thus achieves improved decontamination performance while maintaining overall soundness of the reactor structural materials.

First Embodiment

A chemical decontamination method according to a first embodiment of the present invention is, for example, suitable for decontamination of the reactor structural materials and suppression of corrosion, for example.

In this decontamination method, a nickel-based alloy, for example, Inconel 182, was chosen as the reactor structural material. An Inconel test piece was immersed in ozone water to conduct test confirming whether corrosion occurred or not.

The size of the Inconel 182 test piece as the decontamination object was, for example, 30×10×2 $mm^3$, and the immersion conditions of the test piece were as follows: dissolve ozone concentration in ozone water: 3 ppm, temperature: 80° C., immersion time 10 h.

The following test parameters were used to conduct the test for confirming whether corrosion of the Inconel test piece occurred or not:

i) no oxidation auxiliary agent or pH adjustor was added;

ii) 20 ppm of phosphoric acid was added as the oxidation auxiliary agent;

iii) 40 ppm of nitric acid was added as the pH adjustor;

iv) 20 ppm of phosphoric acid as the oxidation auxiliary agent and 40 ppm of nitric acid as the pH adjustor were added. The oxidation auxiliary agent suppresses corrosion of the matrix of the decontamination object. The pH adjustor increases the dissolved ozone concentration in water (decontamination solution).

Surfaces of the Inconel test piece were observed visually and with an optical microscope before and after immersion in the ozone water. The results of the ozone water immersion test of the Inconel 182 test piece are shown in Table 1.

TABLE 1

| Additive conditions | Surface condition of Inconel test piece |
|---|---|
| No additives | Pitting corrosion occurred |
| Addition of 20 ppm phosphoric acid | No corrosion occurred |
| Addition of 40 ppm nitric acid | Pitting corrosion occurred |
| Addition of 20 ppm phosphoric acid and 40 ppm nitric acid (present invention) | No corrosion occurred |

After 10 hours of immersion, pitting corrosion occurred in the Inconel test piece immersed in ozone water with no additives and the Inconel test piece immersed in ozone water to which 40 ppm of nitric acid was added. In order to suppress the pitting corrosion, in the technology of Patent Document 1, phosphoric acid was added to ozone water. This corrosion test also confirms that corrosion does not occur with ozone water to which 20 ppm of phosphoric acid is added.

The corrosion test of the Inconel test pieces also confirms that corrosion does not occur with ozone water to which 20 ppm of phosphoric acid and 40 ppm of nitric acid are added as additives.

In this embodiment, ozone water to which an oxidation auxiliary agent, e.g., phosphoric acid, is added and a pH adjustor, e.g., nitric acid, is added can suppress corrosion of the nickel-based alloy due to corrosion suppressive effects of the phosphoric acid. Because corrosion of the nickel-based alloy is suppressed, the soundness of reactor structural materials, e.g., materials after decontamination of the reactor pressure vessel interior and the reactor primary system of a nuclear power plant, can be ensured and maintained.

However, as can be understood from the following formulae (1) and (2), the oxidation-reduction potential, which is an index of oxidizing power of ozone water, is large with acid and small with alkali.

[Chemical Formula 1]

<In Acidic Solution>

$$O_3+2H++2e=O2+H_2O\ 2.07\ \text{vs SHE (at 25° C.)} \quad (1)$$

<In Alkaline Solution>

$$O_3+H_2O2e=O_2+2OH\ 1.24\ \text{vs SHE (at 25° C.)} \quad (2)$$

Next, in order to confirm the effect of pH on the oxidation power of ozone ($O_3$) water, dissolution test of oxide films on a SUS test piece was conducted.

The oxide film was formed by immersing for 3000 hours a SUS304 test piece in water under high temperature and high pressure (288° C., 8.5 MPa, oxygen concentration: 200 ppb) simulating the water quality conditions of the primary cooling system of boiling water reactor (BWR). As for the procedure of the oxide film dissolution test, stainless steel, e.g., a SUS304 test piece, with an oxide film was immersed in ozone water at 80° C. for 2 hours, and then in a 200 ppm aqueous oxalic acid solution at 95° C. for 2 hours. The decrease in weight of the SUS test piece was measured.

As for the ozone water treatment conditions, the dissolved ozone concentration was fixed at 3 ppm and the pH of ozone water was in the range between 3 and 5 (pH was adjusted by adjusting the amounts of phosphoric acid and nitric acid added).

The results of the oxide film dissolution test with the SUS304 test pieces are shown in FIG. 1. The amount of the dissolved oxide films increased with decreasing pH of the ozone water. However, at a pH of ozone water of 3 or less, there observed a tendency to stay substantially constant.

The amount of dissolved oxide films in ozone water with pH 3 was about five times as large as that in ozone water with pH 5. The results of the oxide film dissolution test showed that the amount of dissolved oxide films gradually decreased with a pH of ozone water exceeding 3. Thus, in order to accelerate decomposition of the oxide films by ozone water and improve the decontamination performance, it is desirable that ozone water have an acidity of pH 3 or less.

Next, with ozone water having pH 3 capable of improving the decontamination performance, the amounts of secondary wastes produced by the present embodiment and an existing chemical decontamination method were experimentally calculated.

According to the chemical decontamination method of the present invention, the pH of ozone water is 3 when 20 ppm of phosphoric acid is added as an oxidation auxiliary agent and 40 ppm of a strong acid, nitric acid is added as a pH adjustor.

In contrast, according to the existing method in which the pH of ozone water is controlled to 3 by adding phosphoric acid only, since phosphoric acid is close to a weak acid, phosphoric acid in an amount about 50 times the basic concentration condition (20 ppm), e.g., about 1000 ppm, must be added.

Figure 2:
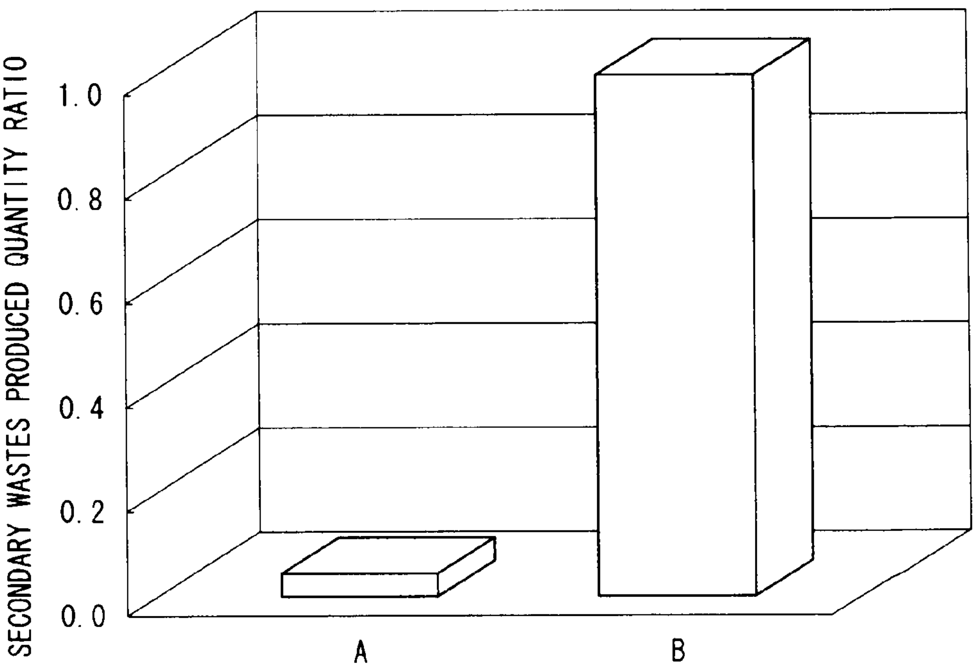
FIG. 2 A graph showing quantities of secondary wastes produced by the chemical decontamination method using ozone according to the first embodiment of the present invention.

In FIG. 2, the phosphoric acid and nitric acid in water show the amount of anion-exchange resin produced in comparison with the present embodiment A. It can be understood from FIG. 2 that the amount of anion exchange resin produced can be reduced to 1/25 that of existing example B.

Second Embodiment

Figure 3:
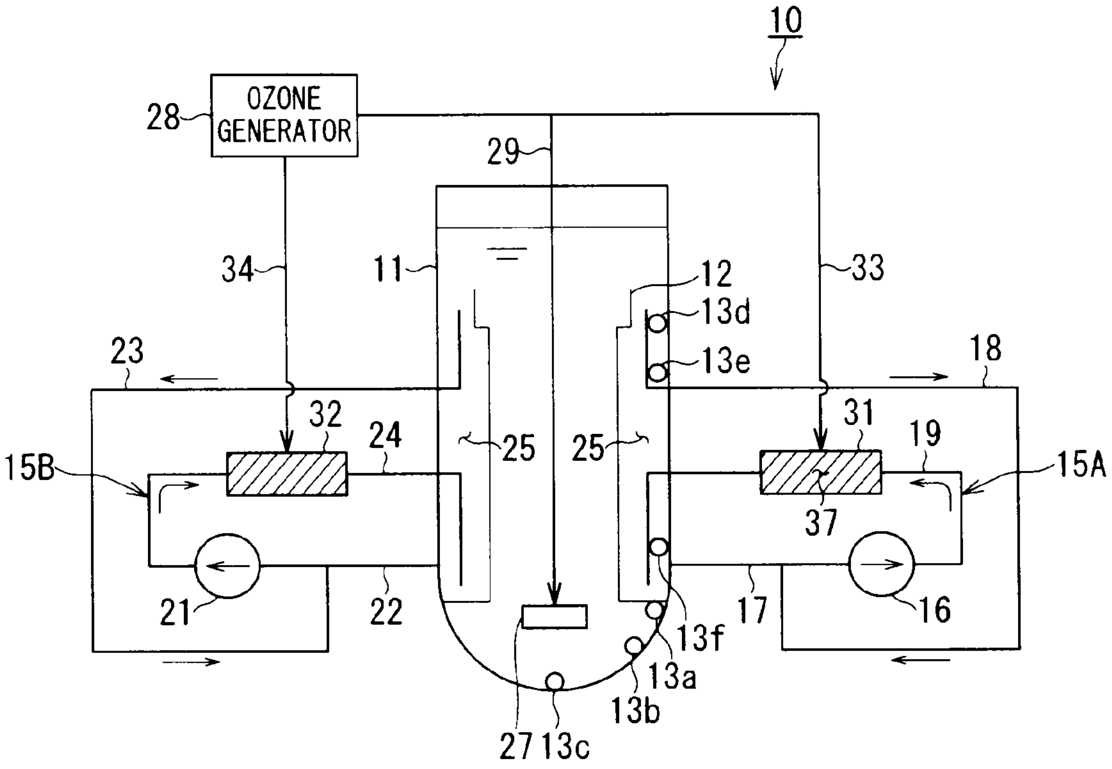
FIG. 3 A system diagram showing a chemical decontamination apparatus according to a second embodiment of the present invention.

FIG. 3 is a schematic diagram showing a chemical decontamination apparatus according to a second embodiment of the present invention.

FIG. 3 shows a dissolved ozone detecting test system simulating BWR to which the chemical decontamination apparatus of the present invention is applied. A dissolved ozone detecting test system 10 includes a cylindrical tank 11 simulating a reactor pressure vessel, and a substantially cylindrical or sleeve-shaped internal structure 12 for controlling the water flow in the tank 11. The internal structure 12 simulates a core shroud. The capacity of the cylindrical tank 11 is, for example, 3.5 $m^3$. In this example, the cylindrical tank 11 and the internal structure 12 correspond to the decontamination objects.

Sampling nozzles 13*a* to 13*f* for measuring the dissolved ozone concentration in water in the cylindrical tank 11 are installed at a plurality of places, e.g., six places, on the inner peripheral wall of the cylindrical tank 11. Water inside the cylindrical tank 11 is circulated through A-series and B-series circulatory systems 15A and 15B.

Water flowing in the A-series circulatory system 15A is sucked into A-system lower suction piping 17 and A-system upper suction piping 18 as an A-system circulation pump 16 is operated, and discharged into the cylindrical tank 11 through A-system discharge piping 19.

The B-series circulatory system 15B is configured similarly to the A circulatory system 15A. Water flowing in the B-series circulatory system 15B is sucked into B-system lower suction piping 22 and B-system upper suction piping 23 as a B-system circulation pump 21 is operated, and discharged into the cylindrical tank 11 through B-system discharge piping 24.

As for the water flow in the cylindrical tank 11, the flow of water ejected to the bottom of the interior of the cylindrical tank 11 is reversed in the lower part of the internal structure 12 and the water travels upward in the internal structure 12. As water reaches the top of the internal structure 12, it forms a recirculation flow moving downward in an annular space 25 between the cylindrical tank 11 and the internal structure 12.

A porous sintered metal element 27 is disposed in the bottom part of the cylindrical tank 11. A gas feed pipe 29 is connected to the sintered metal element 27 to feed ozone gas ($O_3$) generated in an ozone generator 28 into the element interior.

An A-system ozone-dissolving mixer 31 and a B-system ozone-dissolving mixer 32 are respectively provided to the A-system discharge piping 19 and the B-system discharge piping 24 of the A-series and B-series circulatory systems 15A and 15B. An A-system gas feed pipe 33 for feeding ozone gas generated by the ozone generator 28 is connected to the A-system ozone-dissolving mixer 31, and a B-system gas feed pipe 34 is connected to the B-system ozone-dissolving mixer 32.

Since the ozone-dissolving mixers 31 and 32 have the same configuration and functions between the A-system and the B-system, the A-system ozone-dissolving mixer 31 is taken as an example in the description below.

Figure 4:
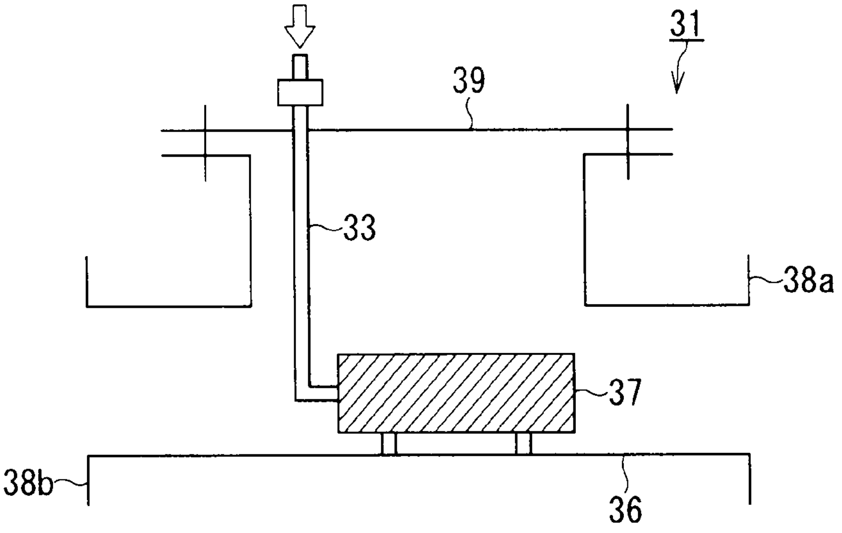
FIG. 4 A schematic view of an ozone dissolving mixer applied to the chemical decontamination apparatus shown in FIG. 3.

FIG. 4 shows the configuration of the A-system ozone-dissolving mixer 31. The A-system ozone-dissolving mixer 31 includes a substantially T-shaped tubular holder 36 disposed in a part of the A-system discharge piping 19 and a porous sintered metal element 37 housed in the holder 36. The holder 36 is connected to the A-system discharge piping 19 via peripheral flanges 38*a* and 38*b*, which are pipe-connecting flanges.

The sintered metal element 27 disposed in the bottom part of the cylindrical tank 11 and the sintered metal element 37 of the A-system ozone-dissolving mixer 31 have one ends sealed and the other ends respectively connected to the gas feed pipe 29 and the A-system gas feed pipe 33 to feed ozone gas into the element interiors. A sintered metal element of the B-system ozone-dissolving mixer 32 is also the same as the sintered metal element 37 of the A-system. The T-shaped tubular holder 36 has a central opening covered with a lid-like flange cover 39. The A-system gas feed pipe 33 is fixed to the lid-shaped flange cover 39 above the holder 36.

The sintered metal elements 27 and 37 are known to be composed of stainless steel and bronze. In the embodiment shown in FIG. 4, stainless steel, e.g., SUS316L, is used from a viewpoint of chemical resistance. The minimum diameter $\phi$min of pores in the sintered metal elements 27 and 37 is, for example, 63 μm while the maximum diameter $\phi$max is, for example, 850 μm. In this embodiment, in order to generate minute ozone gas bubbles and efficiently and quickly dissolve the ozone gas in water, an element with a pore diameter as small as possible, e.g., $\phi$min=63 μm, is used.

Test of dissolving ozone gas in water inside the cylindrical tank 11 using the dissolved ozone detecting test system 10 shown in FIGS. 3 and 4 was carried out.

The conditions employed in the ozone gas dissolution test using the dissolved ozone detecting test system 10 were as follows.

As for the conditions of water inside the cylindrical tank 11, the liquid volume was, for example, 3.5 $m^3$, the temperature was 80° C., and the pH of ozone water was adjusted to 3 by adding 20 ppm phosphoric acid as an oxidation auxiliary agent and 40 ppm nitric acid as a pH adjustor.

The water flow conditions were 80 $m^3$/h for both A-system and B-system, totaling to 160 $m^3$/h, for example.

As for the ozone gas feed conditions, the gas phase ozone concentration was, for example, 120 g/$m^3$, and the ozone gas feed rate was, for example, 45 g/h, for both A-system and B-system, totaling to 90 g/h.

Figure 5:
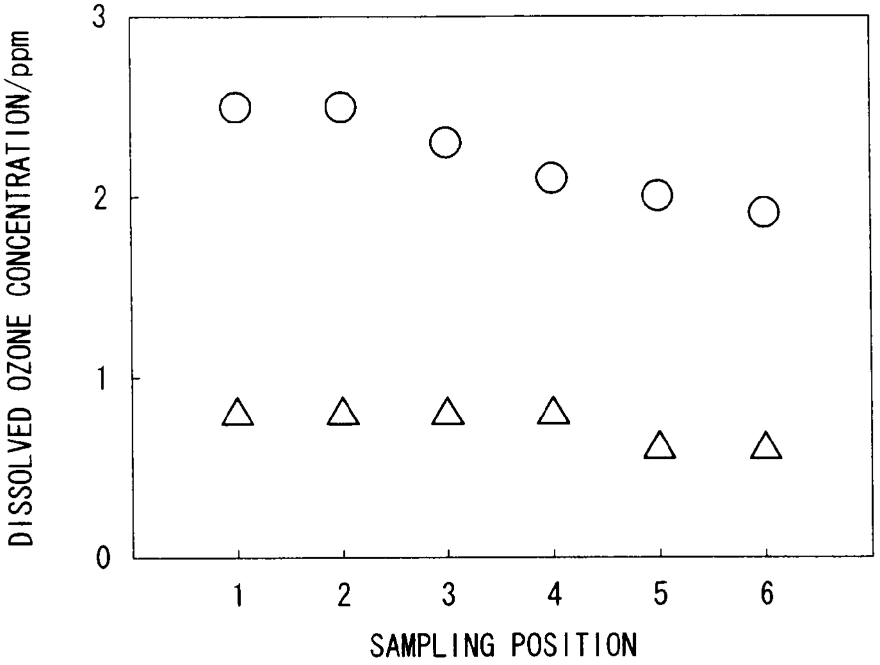
FIG. 5 A distribution chart of dissolved ozone concentration according to a chemical decontamination method using ozone applied to the chemical decontamination apparatus of the present invention.

FIG. 5 shows the results of the dissolved ozone concentration detecting test in which the water conditions in the cylindrical tank 11, the flow conditions, and the ozone gas feed conditions were set as above.

The horizontal axis in FIG. 5 indicates the sampling position shown in FIG. 3 (the positions where sampling nozzles 13*a* to 13*f* are disposed) and the vertical axis indicates the dissolved ozone concentration in water.

In FIG. 5, circular marks (○) represent the dissolved ozone concentrations in the cases where ozone gas is supplied from the A-system ozone-dissolving mixer 31 and the B-system ozone-dissolving mixer 32, and triangular marks (Δ) represent the dissolved ozone concentrations in the cases where ozone gas ($O_3$) is supplied through the sintered metal element 27 disposed in the bottom part of the cylindrical tank 11.

In the case where ozone gas ($O_3$) was fed into water outside the apparatus from the A-system ozone-dissolving mixer 31 and the B-system ozone-dissolving mixer 32 in the A-system discharge piping 19 and the B-system discharge piping 24, respectively, the dissolved ozone concentration was 2.5 ppm near the outlets (13*a*, 13*b*) of the A-system discharge piping 19 and the B-system discharge piping 24 and showed a gradual decreasing tendency with water flow. The dissolved ozone concentration dropped to as low as 1.9 ppm at 13*f* most downstream, as indicated by the circular symbols.

In the case where ozone gas ($O_3$) was fed into water from the sintered metal element 27 disposed in the bottom part of the cylindrical tank 11, the dissolved ozone concentration shifted within the range of 0.6 to 0.8 ppm as indicated by triangular symbols.

From the results indicating the dissolved ozone concentration transition shown in FIG. 5, it has been found that, in order to efficiently and effectively dissolve ozone gas ($O_3$) in water, it is effective to supply ozone gas into water flowing in a narrow space such as A-system discharge piping 19 or B-system discharge piping 24 so that water and ozone gas enter a state near perfect mixing.

As the element that efficiently dissolves ozone gas, a ceramic (alumina) diffusion pipe or a multitubular hollow fiber membrane element composed of a resin described in Patent Document 3 are available. However, resin elements and ceramic diffusion pipes tend to break easily compared to metal pipes.

In this embodiment, the porous sintered metal element 37 that has high mechanical strength and pressure resistance was applied to the A-system ozone-dissolving mixer 31 and the B-system ozone-dissolving mixer 32. An element having a small pore diameter is preferred as the sintered metal element 37. Although the sintered metal element 37 is commonly used in filtering water, foaming a liquid, or mixing, it can be used as a mixer for efficiently and effectually dissolving ozone gas, as indicated by the results of ozone gas dissolution test shown in FIG. 5.

In one example, the dissolved ozone in water is relatively stable in an acidic solution. However, the dissolved ozone is known to rapidly decompose as the acidity in water decreases, the pH increases, or the temperature increases. According to “Ozone Handbook” Japan Ozone Association 2004, the self-decomposition reaction order of ozone is reported to be in the range of 1.0 to 2.0 (dimensionless). However, the temperature condition of the acquired data is mostly 60° C. or less.

In this embodiment, the dissolved ozone detecting test system shown in FIGS. 3 and 4 was used to measure the self-decomposition reaction order of dissolved ozone at 80° C., which is the decontamination condition for ozone water.

Figure 6:
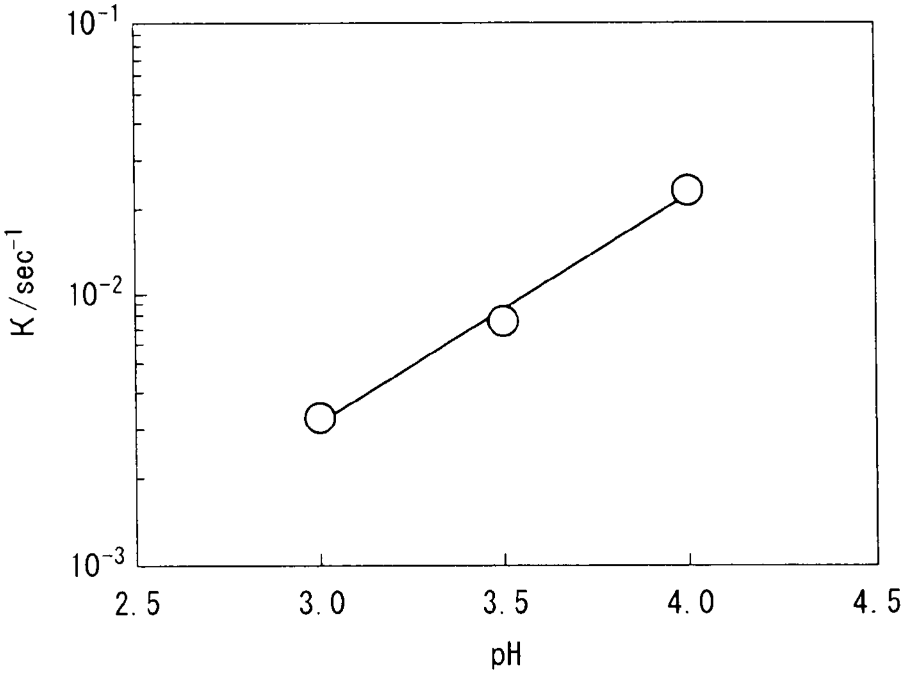
FIG. 6 A graph showing a relationship between pH for the chemical decontamination method using ozone applied to the chemical decontamination apparatus of the present invention and a self-decomposition rate constant of the dissolved ozone.

The measurement results of the self-decomposition rate constant of dissolved ozone are shown in FIG. 6. FIG. 6 shows the pH-dependency of the self-decomposition rate constant plotted by assuming that the ozone self-decomposition reaction conforms to a linear expression.

There is (observed) a tendency that the self-decomposition rate constant of the dissolved ozone linearly increases with the increase in pH. It was found that the decomposition rate constant of the ozone water having a pH of 3 adjusted with phosphoric acid and nitric acid is about a half that of the ozone water having a pH of 3.5 adjusted with phosphoric acid only and about one tenth that of the ozone water having a pH of 4 adjusted with phosphoric acid only.

It was found from the results that even when ozone was efficiently dissolved in water, the dissolved ozone concentration at a position remote from the ozone generator was significantly low at a high pH.

In the case where the chemical decontamination using ozone is applied to large-scale chemical decontamination where the decontamination object is the entire reactor, the dissolved ozone concentration can be prevented from decreasing and uniform chemical decontamination can be achieved by decreasing the pH of ozone water.

In this embodiment, for example, phosphoric acid or a phosphate is added as an oxidation auxiliary agent to ozone water and, for example, nitric acid is added as a pH adjustor, and ozone gas is fed into the water flowing in the pipes from the sintered metal element 37 installed in the A-system discharge piping 19 and the B-system discharge piping 24. Efficient dissolution of ozone can be achieved and self-decomposition of the dissolved ozone can be suppressed by feeding ozone gas. Thus, a remarkable chemical decontamination effect can be obtained with an adequate ozone gas feeding rate.

Third Embodiment

Figure 7:
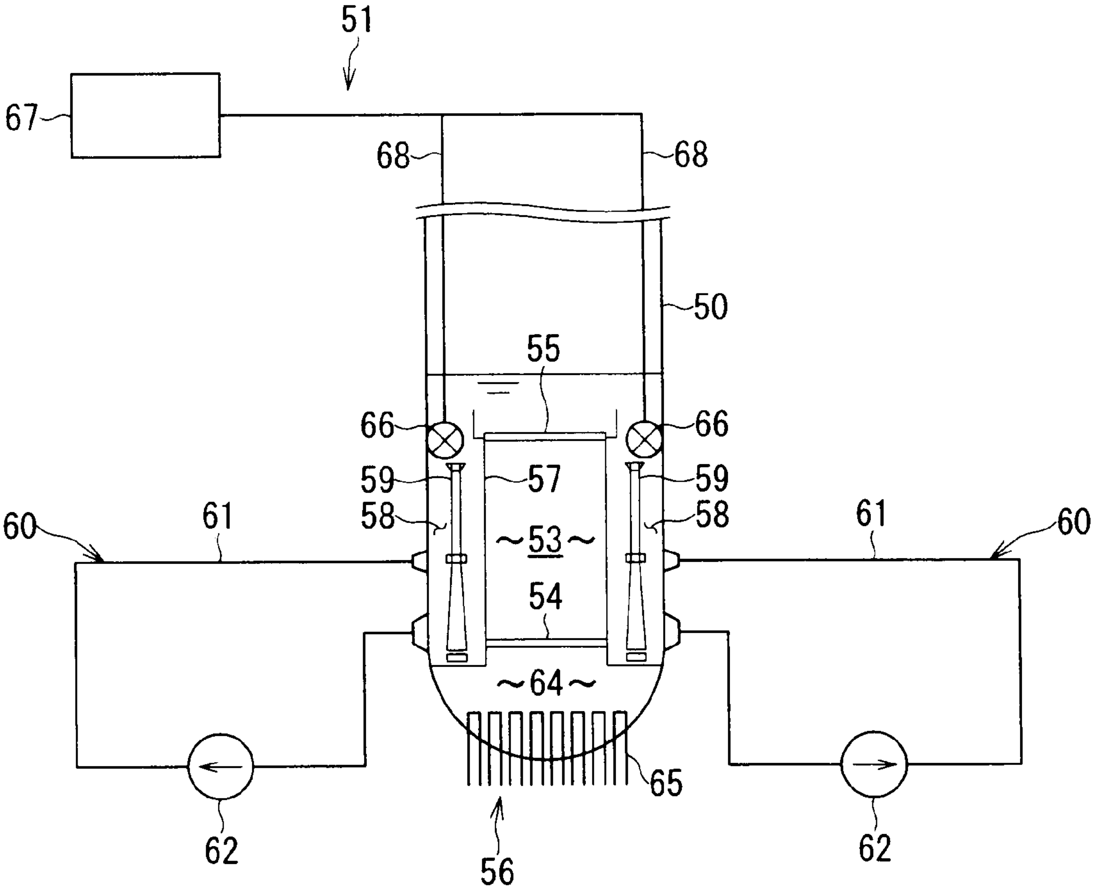
FIG. 7 A schematic view showing a chemical decontamination according to a third embodiment of the present invention for decontaminating a reactor pressure vessel interior of a boiling water reactor (BWR).

FIG. 7 is a schematic diagram showing a chemical decontamination apparatus according to a third embodiment of the present invention.

This embodiment shows a chemical decontamination apparatus 51 that decontaminates a reactor pressure vessel 50 of a boiling water reactor (BWR) with ozone.

A reactor core 53 is disposed inside the reactor pressure vessel 50, and many fuel assemblies are supported by a core supporting plate 54 and an upper grid 55 inside the reactor core 53. Control rods (not shown) are charged in and discharged from the reactor core 53 by a control rod driving mechanism 56. FIG. 7 shows a state in which reactor equipments such as fuel assemblies, the control rods, a steam separator, a steam drier, and the like are removed.

The reactor core 53 is surrounded by a core shroud 57, and jet pumps 59 are disposed in a downcomer portion 58, which is an annular space between the core shroud 57 and the reactor pressure vessel 50. A plurality of jet pumps 59 are disposed in the circumferential direction of the downcomer portion 58 with intervals.

A two-line reactor recirculation system 60 is provided to the lower part of the reactor pressure vessel 50. Each recirculation system piping 61 of the reactor recirculation system 60 is provided with a recirculation pump 62. As the recirculation pumps 62 of the reactor recirculation system 60 are driven, the reactor water inside the reactor pressure vessel 50 returns to the reactor pressure vessel 50 through the recirculation system piping 61, descends as it takes in the reactor water around by operation of the jet pumps 59, and is introduced to a core lower plenum 64. A control rod driving mechanism housing 65 is disposed in the bottom part of the reactor pressure vessel 50 by penetrating the bottom part.

Porous sintered metal elements 66 are disposed near and above the jet pumps 59 disposed in the downcomer portion 58. A plurality of sintered metal elements 66 are disposed along the inner peripheral wall of the reactor pressure vessel 50 near and above the jet pumps 59. Each sintered metal element 66 is connected to an ozone generator 67 through ozone gas feed piping 68. The ozone gas ($O_3$) generated in the ozone generator 67 is fed to the element interior of the sintered metal element 66 through the ozone gas feed piping 68 so that the ozone gas is fed from each sintered metal element 66 to the element exterior, in particular, toward the downcomer portion 58 in the reactor pressure vessel 50. The fed ozone gas is sucked into the jet pumps 59 along with the surrounding reactor water and introduced to the core lower plenum 64.

Operation of the chemical decontamination apparatus 51 using ozone according to this embodiment will be described hereunder.

The reactor pressure vessel 50 is filled with water (hereinafter referred to as "ozone water"), and the recirculation pumps 62 of the reactor recirculation system 60 are driven at a rotation speed 20% of that in the rated operation, for example.

To the ozone water, for example, 20 ppm of phosphoric acid as an oxidation auxiliary agent and nitric acid as the pH adjustor are added to adjust the pH of the ozone water to 3 or less, e.g., 3. Then the water (ozone water) inside the reactor pressure vessel 50 is heated to about 80° C.

Subsequently, ozone gas is generated in the ozone generator 67 of the chemical decontamination apparatus 15, and the generated ozone gas is fed to the sintered metal elements 66 disposed near and above the jet pumps 59 through the ozone gas feed piping 68.

The ozone gas is fed to the element interiors of the sintered metal elements 66, and the fed ozone gas is fed to the ozone water at the element exterior through micropores of the sintered metal elements 66, thereby forming microbubbles in ozone water. The ozone gas forming microbubbles in the ozone water is sucked into the jet pumps 59, mixes with reactor water, partly dissolves in the reactor water, is discharged into the core lower plenum 64 at the core bottom portion, and is forced to move into the reactor core 53 when the flow is reversed in the core lower plenum 64.

After the ozone gas reaches the upper grid 55 of the reactor core, part of the ozone gas is dispersed in a gas phase and delivered to a waste gas processing system, not shown. The remaining ozone gas bubbles move downward in the downcomer portion 58 between the core shroud 57 and the reactor pressure vessel 50, pass through the reactor recirculation system 60, and are again sucked into the jet pumps.

The state of flow of the ozone gas bubbles in the reactor pressure vessel 50 is substantially the same as the example shown in FIG. 3. Thus, the ozone gas is efficiently dissolved in water by operation of the jet pumps 59.

In the case of chemically decontaminating the reactor pressure vessel 50 of an actual BWR, the amount of water retained in the reactor pressure vessel 50 is 300 to 400 $m^3$ for 800 to 1100 MWe-class reactors. In the dissolved ozone concentration detecting test of the example shown in FIG. 3 of the second embodiment, the dissolved ozone concentration inside the cylindrical tank 11 can be retained in the range of 2.0 to 2.5 ppm by supplying 90 g/h of ozone gas into 3.5 $m^3$ of water.

Since the amount of water retained in the reactor pressure vessel 50 of the actual BWR is about 100 times greater, the dissolved ozone concentration in the reactor pressure vessel 50 of the actual reactor can be adjusted to 2 ppm in the ozone water flow by supplying 9000 g/h or more of ozone gas.

In the chemical decontamination apparatus 51 that uses ozone, by adding, for example, phosphoric acid or a phosphate as an oxidation auxiliary agent and nitric acid as a pH adjustor to the ozone water, the soundness of the reactor structural materials can be maintained even in the case where the reactor structural materials are designated as the chemical decontamination objects, for example.

Furthermore, by adjusting the ozone water by addition of the oxidation auxiliary agent and the pH adjustor to render a pH of 3 or less, the dissolved ozone concentration improves, the self-decomposition of the dissolved ozone is suppressed, and thus, the decontamination performance improves.

Sintered metal elements having a pore diameter of several ten to one hundred and several ten micrometers are disposed near the piping through which the decontamination solution circulates, e.g., near the discharge piping of the reactor recirculation system 60 or the inlets of the jet pumps 59, and ozone gas is supplied through the sintered metal element. In this manner, ozone gas can be efficiently dissolved in the decontamination solution and sufficient decontamination performance can be achieved.

With the chemical decontamination apparatus 51 that uses ozone, ozone water serving as a decontamination solution satisfies the condition that the pH is 3 or less and corrosion of the chemical decontamination object, e.g., reactor structural materials, can be effectively and efficiently suppressed. Moreover, the additives for suppressing the corrosion can be optimized, the soundness of the reactor structural materials can be maintained, and the decontamination performance can be enhanced.

Fourth Embodiment

Figure 8:
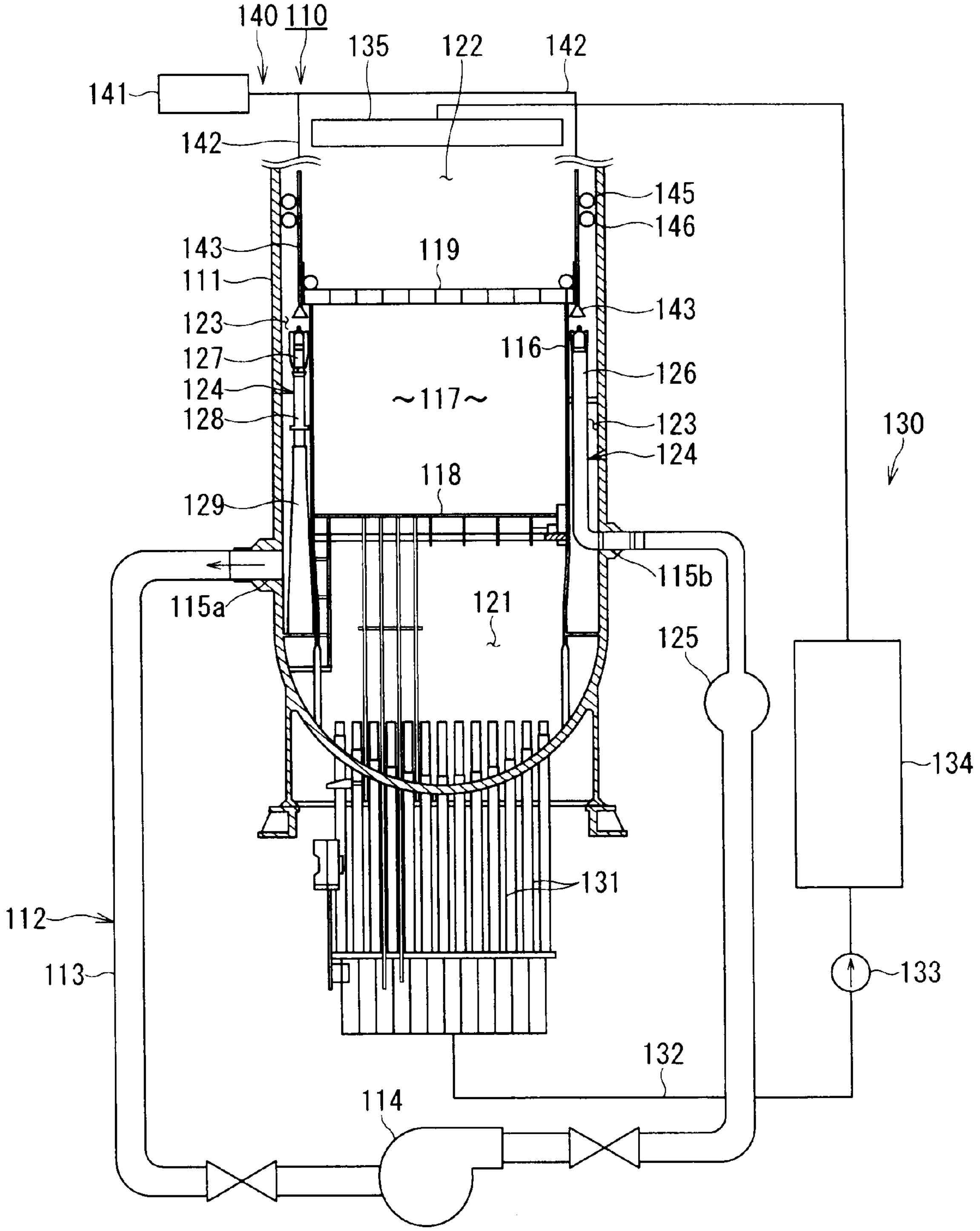
FIG. 8 A structural diagram showing a fourth embodiment of the incore chemical decontamination apparatus of the present invention.

FIG. 8 is a structural diagram showing a fourth embodiment of an incore chemical decontamination apparatus of the present invention.

This incore chemical decontamination apparatus 110 chemically decontaminates decontamination objects such as reactor equipment and various piping of a nuclear power plant. Examples of the decontamination objects are those of the reactor primary system such as a reactor pressure vessel 111, piping 113 and a recirculation pump 114 of a reactor recirculation system 112, and the like of a boiling water-type nuclear power plant. Not only those of the reactor vessel and the reactor primary system of water reactors (BWR and ABWR) but also the reactor vessel and the reactor primary system of pressurized water reactors (PWR) may be the decontamination objects. The reactor recirculation system 112 usually has two lines and is provided to the reactor pressure vessel 111.

In a boiling water reactor, a core shroud 116 is disposed in the reactor pressure vessel 111, and a core 117 is disposed in the core shroud 116. The core 117 is supported by a core supporting plate 118 and an upper grid 119. A core lower plenum 121 is disposed below the core 117 and a core upper plenum 122 is disposed above the core.

The gap between the reactor pressure vessel 111 and the core shroud 116 is formed to serve as an annulus portion 123 having a sleeve shape or a ring shape. A plurality of jet pumps 124, i.e., twelve (12) pumps in six pairs to twenty (20) pumps in ten pairs, are provided in the circumferential direction in the annulus portion 123. Each jet pump 124 includes a jet pump riser pipe 126 which is connected via an inlet nozzle **115*b* to header piping 125 branching from the recirculation piping 113, a jet pump nozzle 127 that reverses and bifurcates the upward flow ascending in the jet pump riser pipe 126, a throat portion (mixing chamber) 128 that sucks the system water (reactor water) from the inlet of the jet pump 124 disposed near the jet pump nozzle 127 to conduct mixing, and a diffuser 129 that guides the mixed water into the core lower plenum 121**.

The incore chemical decontamination apparatus 110 also includes a temporary decontamination loop 130 disposed at a lower outer side of the reactor pressure vessel 111. The temporary decontamination loop 130 includes a temporary circulation line 132 connected to a control rod housing 131 of a control rod driving mechanism (CRD) disposed at the bottom part of the reactor pressure vessel 111, and a circulation pump 133 and a chemical decontamination unit 134 disposed in the temporary circulation line 132. The downstream side of the chemical decontamination unit 134 is connected to a temporary spray ring 135 so as to constitute decontamination agent supplying means. The temporary spray ring 135 is installed to the upper portion of the reactor pressure vessel 111 and sprays a decontamination solution such as oxalic acid or the like is sprayed into the reactor pressure vessel 111 from the spray ring 135 during chemical decontamination operation.

The temporary decontamination loop 130 is designed to remove the decontamination solution from the lower part of the reactor pressure vessel 111 by using the circulation pump 133 through the temporary circulation line 132 and deliver the removed decontamination solution to the chemical decontamination unit 134. The chemical decontamination unit 134 is a unit in which chemical decontamination is conducted and includes, for example, a heater, an ion exchange resin tower for capturing radioactivity, a decontamination agent decomposition unit that decomposes the decontamination agent upon completion of the decontamination, and a chemical solution-injecting pump for injecting a decontamination agent (solution) such as oxalic acid or the like.

The decontamination solution from the chemical decontamination unit 134 is sprayed from the upper side in the reactor pressure vessel 111 through the spray ring 135. The temporary decontamination loop 130 with the chemical decontamination unit 134 constitutes decontamination solution supplying means.

The incore chemical decontamination apparatus 110 chemically decontaminates the interior of the reactor pressure vessel 111, the internal structures such as the core shroud 116, the core supporting plate 118, and the upper grid 119, internal equipment such as the jet pumps 124, and the decontamination objects in the reactor primary system of the reactor recirculation system 112. In order to enhance the decontamination efficiency, the operation of the recirculation pump 114 required for the internal flow inside the reactor pressure vessel 111 is carried out. The jet pumps 124 constitute ozone water generating means for generating ozone water by mixing ozone gas supplied from ozone supplying means 140, and the reactor recirculation system 112 constitutes ozone water circulating means for circulating the generated ozone water inside the lines of the reactor primary system.

As the recirculation pump 114 is driven, the ozone water or the decontamination solution inside the reactor pressure vessel 111 passes through the reactor recirculation system 112, ascends in the jet pump riser pipe 126 from the recirculation piping 113, and is discharged into the core lower plenum 121 from the jet pump nozzle 127 of the jet pump 124 by taking in the surrounding water. The decontamination solution discharged into the core lower plenum 121 is reversed herein and ascends in the core shroud 116 so as to be again introduced into the annulus portion 123. The decontamination solution introduced into the annulus portion 123 descends and again introduced into the reactor recirculation system 112 provided at the lower portion of the annulus portion 123. The internal structures and the internal equipment inside the reactor pressure vessel 111 and the reactor recirculation system 112 constitute the reactor primary system.

An organic acid such as oxalic acid is usually used as the decontamination solution for chemical decontamination. The decontamination solution (decontamination agent) of the organic acid is used in the reduction decontamination process. The iron oxides and radioactivity such as Co-60 and Co-58 entrapped in the oxides are eluted (dissolved) in the decontamination solution by conducting the reduction decontamination process.

On the other hand, the ozone supplying means 140 for supplying ozone gas into the reactor pressure vessel 111 is provided above the reactor pressure vessel 111. The ozone supplying means 140 includes an ozonizer 141 constituting an ozone generator, ozone supply pipes (diffusion pipe ducts) 142 in which ozone ($O_3$) gas generated in the ozonizer 141 is supplied, and ozone diffusion pipes 143 connected to ends of the ozone supply pipes 142.

Each ozone diffusion pipe 143 is suspended from above the reactor pressure vessel 111, for example, from an operation floor, not shown, and has its head guided into the annulus portion 123 so that it is vertically disposed near and above the jet pump nozzle 127 of the jet pump 124. The ozone gas generated in the ozonizer 141 is jet out from the ozone diffusion pipe 143 having an opening near the inlet (throat) of the jet pump nozzle 127. A plurality of, for example, 6 to 12, ozone diffusion pipes 143 are provided in the circumferential direction so that their heads oppose to the annulus portion 123 in the reactor pressure vessel 111.

After the settling of the dissolution of radioactivity adhering on the metal surfaces of the internal structures, internal equipment, and the reactor primary system of the reactor recirculation system 112, which are the objects decontaminated by the decontamination solution contained in the reactor pressure vessel 111, the metal oxides such as iron oxides are dissolved, decomposed and purified with the decontamination agent such as oxalic acid and the like, and the ozone supplying means 140 is operated to proceed to an oxidation process in which oxidation treatment is conducted to dissolve the oxide films.

The oxidation treatment in the chemical decontamination is conducted to dissolve the radioactivity captured in the chromium oxides in the inner layers of the metal surfaces of the decontamination objects. In the incore chemical decontamination apparatus 110 shown in FIG. 8, ozone water having a particular ozone concentration, e.g., 1 ppm or more, is used as the oxidant.

Since ozone is a self-decomposable gas and has a short lifetime, it is necessary to constantly inject ozone gas into water inside the reactor pressure vessel 111 from the ozone supplying means 140. Ozone gas is generated in the ozonizer 141, diffused through the ozone diffusion pipes 143, and injected into the reactor.

As for the injection point of the ozone gas, the ozone gas is forcibly sucked into the jet pumps 124 along with the internal flow of the recirculation pump 114 above the annulus portion 123. The position of each ozone diffusion pipe 143 is preferably as close to the inlet (throat) of the jet pump 124 as possible. In order to stably perform injection by overcoming the water depth of the ozone gas pressure, the ozone diffusion pipe 143 is disposed at a position within a certain distance, e.g., about 1 m, from the upper edge of the core shroud 116 in the case where no pressure-elevating apparatus, such as a booster pump or the like, is provided. A plurality of, e.g., several to ten and several, ozone diffusion pipes 143 are provided in the circumferential direction above the annulus portion 123 near and above the jet pumps 124.

The purpose of the oxidation treatment using ozone water is to dissolve oxide films having a high chromium content in the inner layer of the decontamination objects. Once the dissolution of the chromium-containing oxide films is settled, the oxidation process of performing oxidation treatment with ozone water comes to an end. After completion of the oxidation process, there is no need to perform special ozone decomposition process and the ozone may be left to self-decompose or treated in the subsequent reduction process by injecting oxalic acid.

Further, in FIG. 8, reference numeral 145 denotes a water supply sparger connected to the reactor water supply system via header piping, and 146 denotes a core spray piping.

An operation of the incore chemical decontamination apparatus, i.e., the incore chemical decontamination method, will be described hereunder.

A large-scale chemical decontamination operation involving providing the incore chemical decontamination apparatus 110 to the reactor pressure vessel 111 so as to chemically decontaminate the decontamination objects of the reactor primary system, such as the reactor pressure vessel 111, the reactor structures, the reactor equipment, and the reactor recirculation system 112 is carried out at the time of regular inspection or maintenance involving shutoff of the reactor.

As for the chemical decontamination operation, a recirculation pump 1 of the reactor recirculation system 112 for circulating the system water in the reactor primary system is operated to generate a flow inside the reactor pressure vessel 111. Meanwhile, ozone gas generated in the ozonizer 141, which is an ozone generator, is efficiently injected into the inlet of each jet pump 124 and circulated inside the reactor pressure vessel 111 since the ozone supplying means 140 is provided and the ozone diffusion pipes 143 are disposed in the upper portion or above the internal annulus portion. That is, the generated ozone gas is sucked from the inlet of each jet pump 124 and mixed with pump water in the mixing chamber 128 by the diffuser 129, thereby generating ozone water. The generated ozone water is introduced into the core lower plenum 121. The mixed flow (ozone water) introduced into the core lower plenum 121 is reversed herein and introduced to the interior or the core shroud 116, thereby forming an upward flow in the core shroud 116.

The upward flow ascending in the core shroud 116 is reversed in the annulus upper portion inside the reactor pressure vessel 111 and becomes a downward flow which is sucked into the inlet (jet pump inlet mixer) of each jet pump 124. The injected ozone gas is nearly entirely taken in and sucked into the inlet of the jet pump 124. As a result, no ozone in bubble form is ever introduced into the outlet (outlet nozzle 115*a*) of the reactor recirculation system 112 provided in the lower portion of the annulus portion 123. Thus, there is no risk of pump cavitation in the recirculation pump 114 of the reactor recirculation system 112.

The oxide films formed on the inner peripheral wall of the reactor pressure vessel 111 and the outer peripheral wall of the core shroud 116 constituting the annulus portion 123 are dissolved in the ozone-gas containing downstream flow (ozone water) and removed.

The bubbles of ozone gas do not reach the recirculation pump 114 of the reactor recirculation system 112. Since only the ozone water in which ozone is dissolved in the circulation water is introduced into the recirculation pump 114, the interior of the recirculation piping 113 can be efficiently decontaminated with the ozone water, and the oxide films can be dissolved.

The bubbles of ozone gas that have passed through the mixing chamber 128 from the inlet of each jet pump 124 and have been introduced into the diffuser 129 are stirred by mixing to thereby form ozone water which is discharged to the reactor bottom portion (core lower plenum) and oxidizes and dissolves the oxide films in the reactor bottom portion. After the oxidation and dissolution, the ozone water sequentially comes into contact with the internal structures, i.e., the core supporting plate 118, the inner peripheral wall of the core shroud 116, and the upper grid 119, thereby sequentially dissolving the oxide films formed on the surfaces. On the other hand, the excess ozone gas that remains undissolved despite the mixing effect shifts to a gas phase portion from the water surface at the reactor center and discharged outside.

With the incore chemical decontamination apparatus 110, even in the large-scale internal chemical decomposition operation, ozone water having a particular ozone concentration can efficiently spread and circulate in the reactor pressure vessel 111, the entire reactor recirculation system 112, and the reactor primary system. Thus, the oxide films formed on the internal structures and the recirculation piping outside the core can be efficiently dissolved.

Before or after the process of dissolving the oxide films with ozone water, a reduction decontamination process of the decontamination solution using, for example, oxalic acid, may be combined so as to eliminate the nuclear radiation except for the radioactivation of the reactor internal structures and the reactor recirculation system 112. As a result, the amount of radiation can be significantly reduced.

Fifth Embodiment

Figure 9:
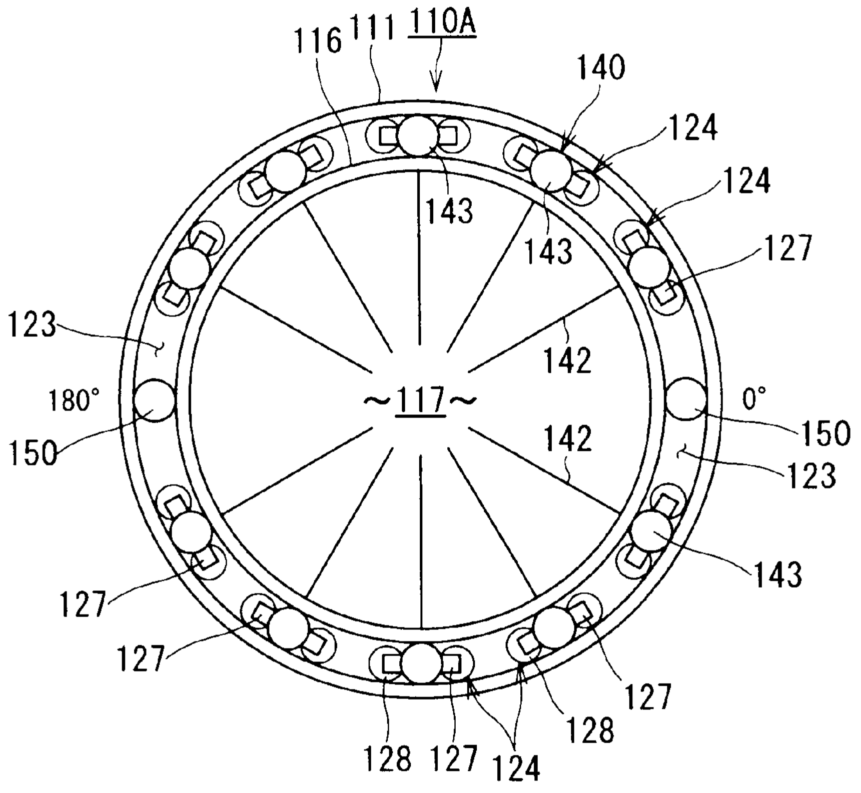
FIG. 9 A structural diagram showing a fifth embodiment of the incore chemical decontamination apparatus of the present invention.

FIG. 9 is a structural diagram showing a fifth embodiment of an incore chemical decontamination apparatus according to the present invention.

FIG. 9 is a top cross-sectional view showing an interior of the reactor pressure vessel 111 installed in a boiling water-type nuclear power plant and is a plan view showing the positional relationship among the reactor pressure vessel 111, the core shroud 116, the jet pumps 124, and the ozone diffusion pipes 143. FIG. 9 shows an example in which twenty (10 pairs of) jet pumps 124 are installed in the annulus portion 123 formed between the reactor pressure vessel 111 and the core shroud 116. The jet pumps 124 are installed in the circumferential direction of the annulus portion 123 with particular intervals.

An ozone diffusion pipe 143 constituting the ozone gas supplying means 140 is disposed near and above each pair of jet pumps 124. Since the structure of the reactor pressure vessel 111 of the nuclear power plant and the structures of the reactor recirculation system and the provisional decontamination loop serving as the decontamination solution supplying device are identical to those of the fourth embodiment, they are denoted by the same reference numerals and diagrammatic representation and description thereof are hence simplified or omitted. Note that reference numeral 142 denotes a diffusion pipe duct (ozone supply pipe) for the ozone diffusion pipe 143 and reference numeral 150 denotes an access hole cover.

In an internal chemical cleaning apparatus 110A shown in FIG. 9 also, as the recirculation pump 114 of the reactor recirculation system 112 is driven, the system water in the reactor pressure vessel 111 ascends the riser pipe 126 of each jet pump 124 through the header piping (ring header) from the reactor recirculation system 112, is bifurcated by the jet pump nozzles 127, and is introduced to each pair of jet pumps 124.

On the other hand, the ozone diffusion pipes 143 of the ozone gas supplying means 140 are disposed near and above or directly above 10 pairs of the jet pump nozzles 127. The ozone diffusion pipes 143 are distributed to respectively correspond to the jet pump pairs to avoid interference with the interfering components such as the water supply spargers 145 and the core spray piping 146 above the annulus portion 123 and installation brackets outside the core shroud 116.

The ozone gas injected from the ozone diffusion pipes 143 of the ozone gas supplying means 140 is sucked along with the surrounding reactor water into the suction inlets of the pairs of the jet pumps 124, and introduced to the throat portions (mixing chambers) 128 to be stirred and mixed. The resulting mixed water is discharged to the core lower plenum 121 through the diffusers 129.

The reactor water introduced to the annulus portion 123 turns to a downstream flow and is introduced to the outlet of the reactor recirculation system 112 in the annulus lower portion. However, the reactor water introduced in the reactor recirculation system 112 contains substantially no ozone gas jet out from the ozone diffusion pipes 143. Therefore, there is no need to worry about occurrence of cavitation in the recirculation pump 114 of the reactor recirculation system 112.

Although ozone gas bubbles do not reach the recirculation pump 114 of the reactor recirculation system 112, ozone water containing a particular concentration of dissolved ozone is circulated therein and thus the decontamination effect is not degraded.

When the ozone water discharged from the recirculation pump 114 is introduced to the jet pumps 124 and discharged from the pump nozzles 127 of the jet pumps 124, the ozone water takes in ozone gas along with surrounding reactor water (internal circulation water) and is introduced to the mixing chambers 128 of the jet pumps 124. The ozone gas introduced in each mixing chamber 128 is dissolved in water by the mixing effect, is introduced to the core lower plenum 121 from the diffuser 129, oxidizes and dissolves the oxide films in the reactor bottom portion, and then sequentially dissolves oxide films on the core supporting plate 118, the shroud internal circumferential wall, and the upper grid 119, i.e., the internal structures.

Excess ozone gas shifts to the gas phase portion from the water surface at the reactor center and is discharged.

Outlet nozzles of the reactor pressure vessel 111 are arranged at the 0° position and the 180° position of the annulus portion of the reactor pressure vessel 111 where no ozone diffusion pipes 143 are installed. Since the downstream flow in the annulus portion 123 proceeds toward the outlet nozzles by forming a biased flow, there is no need to install ozone diffusion pipes at the 0° position and the 180° position of the annulus portion.

A large-scale incore chemical decontamination operation can be conducted with the incore chemical decontamination apparatus 110A shown in the fifth embodiment also. In the chemical decontamination operation also, ozone water having a particular ozone concentration can be supplied to the reactor pressure vessel 111 and the entire reactor primary system of the reactor recirculation system 112.

The oxide films formed on the internal structures and internal equipment of the reactor pressure vessel 111 and the recirculation system 112 outside the core can be efficiently dissolved.

Figure 10:
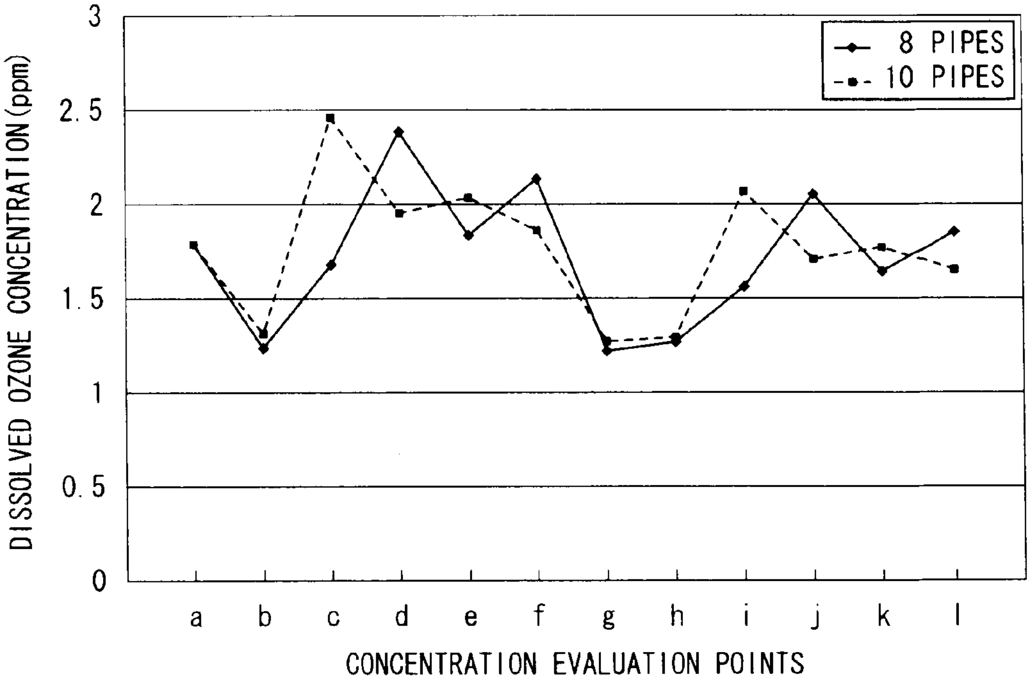
FIG. 10 A graph showing dissolved ozone concentrations measured at various positions inside the reactor.
Figure 11A:
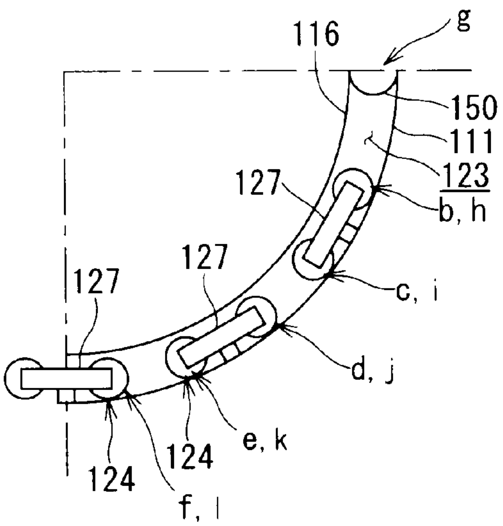
Figure 11B:
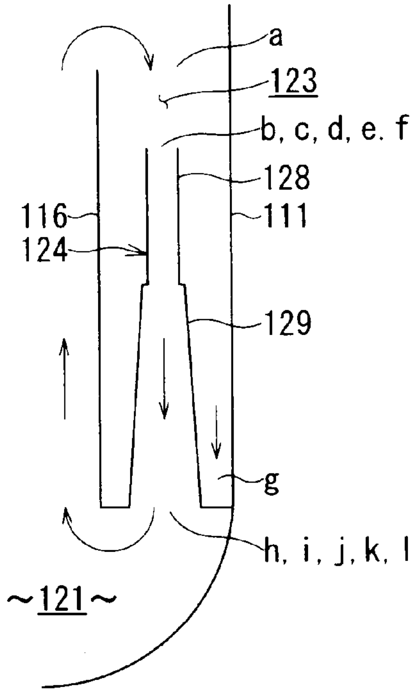

The broken line in the graph of FIG. 10 indicates the relationship between the ozone concentration evaluation points (internal positions of the reactor pressure vessel) “a” to “l” and the dissolved ozone concentrations observed at the ozone concentration evaluation points in the case where ten ozone diffusion pipes 143 are installed. The ozone concentration evaluation points “a” to “l” in FIG. 10 correspond to internal positions “a” to “1” of the reactor pressure vessel shown in FIGS. 11A and 11B.

The fifth embodiment is an example in which the ozone gas discharged from the ozone diffusion pipes 143 is supplied at a rate of 11.5 kg/h. FIG. 11 shows that a dissolved ozone concentration of 1 ppm or more is obtained even at a position where the dissolved ozone concentration is the lowest in the reactor pressure vessel 111. Nonpatent Document 1 (Aoi et al., “Development of Ozone-type Chemical Decontamination Technique (vol. 2)—Decontamination Performance and Evaluation of Effects on Materials” Atomic Energy Society of Japan “2001 Spring Meeting” Lecture No. M38, Abstracts of Lectures, Vol. III, p. 691) reports that sufficient removal effect can be achieved at a dissolved ozone concentration of 1 ppm or more.

By combining oxidation by ozone water having a particular dissolved ozone concentration and the reduction decontamination process utilizing the temporary decontamination loop 130 (constituting the decontamination solution supplying device) before or after the oxidation process, the radioactivity can be efficiently and effectively removed except for the radioactivation of the reactor pressure vessel 111 and the reactor recirculation system 112. As a result, the amount of radiation can be significantly reduced.

Moreover, since ozone gas bubbles do not enter the recirculation pump 114 even when the recirculation pump 114 of the reactor recirculation system 112 is operated, occurrence of cavitation due to the ozone gas bubbles can be securely prevented, and adverse effects of cavitation can be avoided.

Sixth Embodiment

Figure 12:
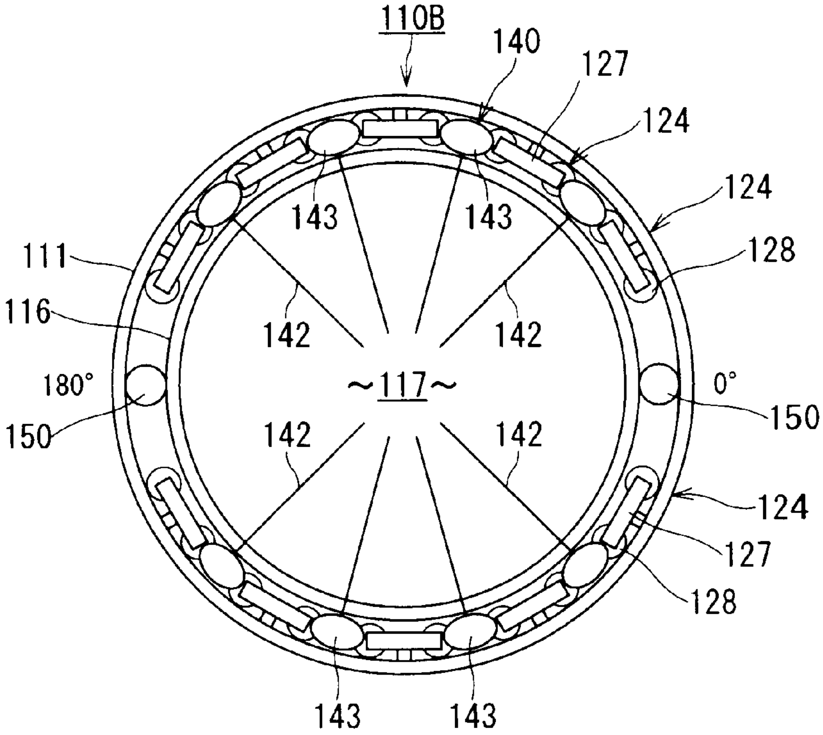
FIG. 12 A structural diagram showing a sixth embodiment of the incore chemical decontamination apparatus of the present invention.

FIG. 12 is a structural diagram showing a sixth embodiment of the incore chemical decontamination apparatus of the present invention.

In describing an incore chemical decontamination apparatus 110B of the sixth embodiment, the same structures as those of the incore chemical decontamination apparatus 110 described in the fourth embodiment are denoted by the same reference numerals and diagrammatic representation and description thereof are simplified or omitted.

FIG. 12 is a top-cross-sectional view of the reactor pressure vessel 111 installed in a boiling water-type nuclear power plant and is a plan view showing the positional relationship among the reactor pressure vessel 111, the core shroud 116, the jet pumps 124, and the ozone diffusion pipes 143. In FIG. 12, 20 (10 pairs) jet pumps 124 are disposed in the annulus portion formed between the reactor pressure vessel 111 and the core shroud 116. The jet pumps 124 are disposed in the circumferential direction of the annulus portion 123 at predetermined intervals.

Ozone diffusion pipes 143 constituting the ozone gas supplying means 140 are disposed above each intermediate portion between pairs of the jet pumps 124. The ozone diffusion pipes 143 are vertically disposed near and above the intermediate portions between the adjacent jet pump pairs. The ozone diffusion pipes 143 are disposed between every adjacent pairs of the jet pumps 124 except at, for example, the 0° position and the 180° position where the outlet nozzles 115 of the reactor recirculation system 112 are located.

The internal structure of the reactor pressure vessel 111 and the structures of the reactor recirculation system 112 and the provisional decontamination loop constituting the decontamination solution supplying device of the nuclear power plant are the same as those described in the fourth embodiment.

The flow of the system water (circulation water) in the reactor circulating in the reactor recirculation system 112 is divided with the header piping (ring header) of the reactor recirculation system 112, passes through the inlet nozzle 115*b*, ascends in the jet pump riser pipe 126, is bifurcated by the jet pump nozzle 127, and enters two (one pair) jet pumps 124.

Since the reactor recirculation system 112 usually includes two lines, there are 20 (10 pairs) jet pumps 124. In FIG. 12, an ozone diffusion pipe 143 of the ozone gas supplying means 140 is provided in each of the spaces between the adjacent pairs of ten pairs of (twenty) jet pumps 124. In the example shown in FIG. 12, eight ozone diffusion pipes 143 are disposed. In this example, four ozone diffusion pipes 143 are disposed on one side of the upper portion of the annulus portion 123 and other four ozone diffusion pipes 143 are provided on the other side. The number of the ozone diffusion pipes 143 is not limited to eight and may be any number of 6 to 19.

Ozone gas is injected from the ozone diffusion pipes 143 disposed near the upper portions of the jet pump nozzles 127 at the intermediate portions between the jet pump 124 pairs, and most of the ozone gas is sucked into the suction inlets of the adjacent jet pumps 124 between the adjacent jet pump pairs. The ozone gas sucked into the jet pumps 124 is stirred and mixed in the throat portions 128. There is substantially no ozone gas that descends in the annulus portion 123 and is introduced to the outlet nozzles 115*a* of the reactor recirculation system 112. Although trace amounts of ozone gas may be contained in the downstream flow descending the annulus portion 123, the ozone gas eventually dissolves in the downstream flow as it descends, thereby giving ozone water containing dissolved ozone, and the ozone water is introduced into the recirculation pump 114. Thus, there is no risk of occurrence of pump cavitation in the recirculation pump 114.

Although bubbles of ozone gas are rarely introduced into the recirculation pump 114 of the reactor recirculation system 112, ozone water having a particular concentration of dissolved ozone is circulated in the recirculation piping 113. Thus, oxidation treatment by the ozone water can be accelerated and the decontamination effect does not deteriorate. The ozone water discharged from the recirculation pump 114 and supplied from the inlet nozzle 115*b* into the jet pumps 124 is stirred and mixed in the mixing chambers (throat portions) 128 by taking in the reactor water containing ozone gas.

The ozone gas bubbles introduced into the mixing chambers 128 of the jet pumps 124 dissolve in the water by the mixing effect, descend in the diffusers 129, and are discharged into the core lower plenum 121. The oxidation treatment with discharged water discharged into the core lower plenum 121 dissolves the oxide films in the core bottom portion. After the oxide films in the core bottom portion are dissolved, the oxide films on the internal structures (the core supporting plate 118, the shroud inner peripheral wall, and the upper grid 119) are sequentially dissolved. Excess ozone gas shifts to the gas phase portion from the water surface at the reactor center inside the reactor pressure vessel 111 and is then discharged outside.

The ozone diffusion pipes 143 are not disposed at, for example, the 0° position and the 180° position in the circumferential direction. Since the outlet nozzle 115*a* of the reactor recirculation system 112 is disposed at a position in the circumferential direction where no ozone diffusion pipe 143 is disposed, the downstream flow in the annulus portion 123 becomes a biased flow heading toward the outlet nozzle 115*a*. Thus, the effect of dissolving the oxide films is not reduced.

According to the incore chemical decontamination apparatus 110B, the large-scale incore chemical decontamination operation can be effectively and efficiently conducted in the reactor pressure vessel 111 and the entire reactor recirculation system 112. The incore chemical decontamination operation uses water (ozone water) having a particular ozone concentration, and the ozone water prevails and circulates in the entire reactor pressure vessel 111 and in the entire reactor recirculation system 112 as the recirculation pump 114 of the reactor recirculation system 112 is operated. Thus, the oxidation treatment that efficiently dissolves oxide films formed on the internal structures and the reactor recirculation system 112 can be carried out.

The solid line in the graph of FIG. 10 shows an example of the detected values of ozone concentrations at various positions (concentration evaluation points "a" to "l") in the reactor pressure vessel 111 having eight ozone diffusion pipe 143. In this example, the ozone gas was fed into the reactor pressure vessel 111 at a particular rate, for example, 11.5 kg/h, into the reactor pressure vessel 111. In this incore chemical decontamination apparatus 110B, a dissolved ozone concentration of 1 ppm or more is obtained even at a position where the dissolved ozone concentration is the lowest among the positions "a" to "l" (refer to FIGS. 11A and 11B). Because of the dissolved ozone concentration of 1 ppm or more, the sufficient decontamination effect can be achieved.

By combining the oxidation process involving the dissolved ozone concentration of 1 ppm or more and the reduction decontamination process using the decontamination agent before or after the oxidation treatment, the radioactivity can be removed except for the radioactivation inside the reactor pressure vessel 111 interior, the internal structures, and the reactor primary system of the reactor recirculation system 112. As a result, the amount of radiation can be significantly reduced. The decontamination agent such as oxalic acid or the like is sprayed into the reactor pressure vessel 111 from the temporary spray ring 135.

Moreover, since ozone gas in a bubbled state is not introduced into the recirculation pump 114 of the reactor recirculation system 112, pump cavitation by bubbles does not occur.

Seventh Embodiment

Figure 13:
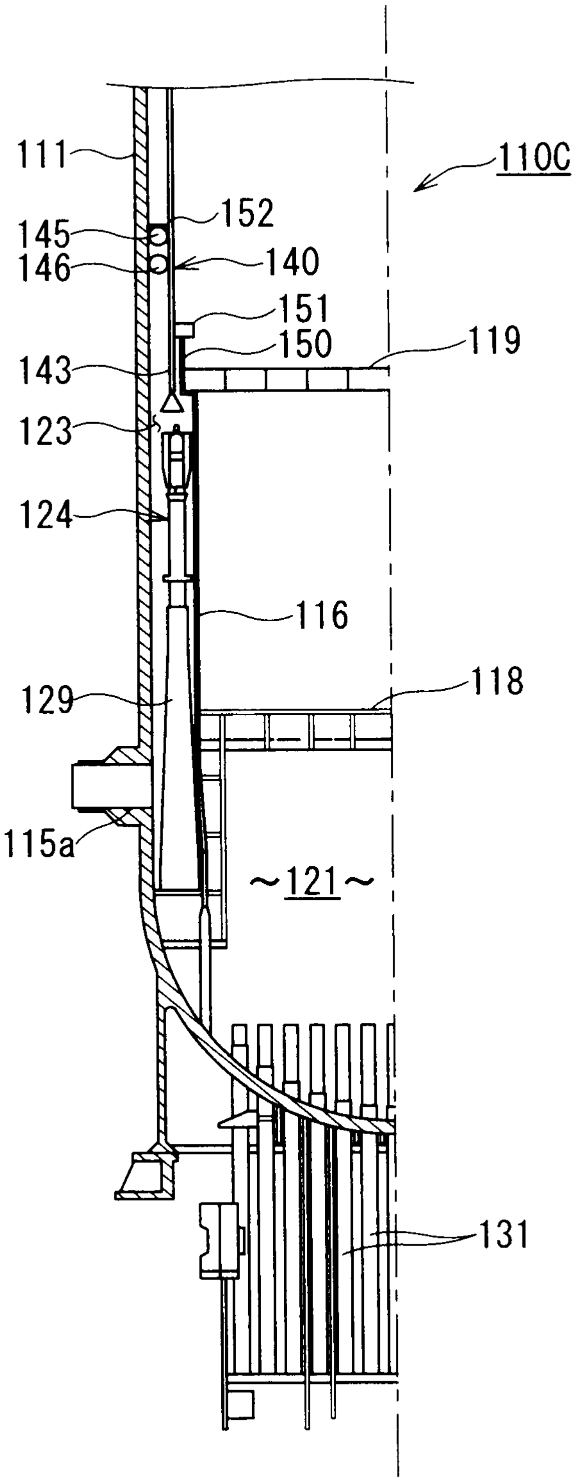
FIG. 13 A structural diagram showing a seventh embodiment of the incore chemical decontamination apparatus of the present invention.

FIG. 13 is a structural diagram showing a seventh embodiment of an incore chemical decontamination apparatus of the present invention.

This embodiment is characterized in the installation of the ozone diffusion pipes 143 of the ozone gas supplying device 140. Since other structures are identical to those of the incore chemical decontamination apparatus 110B shown in FIG. 8, the same components are represented by the same reference numeral numbers and descriptions thereof are simplified or omitted.

An incore chemical decontamination apparatus 110C shown in FIG. 13 has ozone diffusion pipes 143 of the ozone gas supplying means (device) 140 stably vertically installed in the reactor pressure vessel 111. The head of each ozone diffusion pipe 143 is suspended downward from an operation floor, not shown, and located in the upper portion of the annulus portion 123 between the reactor pressure vessel 111 and the core shroud 116. The ozone diffusion pipe 143 is long SUS piping several meters, e.g., about 6 m, in length. The upper end of the diffusion pipe is positioned in the upper part of the reactor pressure vessel 111. The ozone diffusion pipes 143 are arranged in an unused space near the peripheral wall of the reactor pressure vessel 111 so as to effectively prevent the ozone diffusion pipes 143 from interfering with other internal equipment.

FIG. 13 is a vertical cross-sectional view showing a lower left half of the reactor pressure vessel 111. Each of the ozone diffusion pipes 143 vertically disposed in the reactor pressure vessel 111 is fixed to the reactor pressure vessel 111 at a plurality of positions in a vertical direction, e.g., at least two positions in a vertical direction. In the incore chemical decontamination apparatus 110C shown in FIG. 13, the portion of the ozone diffusion pipe 143 near the bottom end is fixed to an upper shroud ring 150 with a clamping unit 151, and the portion of the pipe near the top end is fixed to the water supply sparger 145 with a clamping unit 152.

In the case of fixing the lower part of the ozone diffusion pipe 143 onto the upper shroud ring 150, a bolt bracket of a shroud head bolt, not shown, disposed vertically on the upper shroud ring 150 can be used. A plurality of shroud head bolts are vertically provided in the circumferential direction at the top part of the upper shroud ring 150, and the bolt brackets are installed onto the shroud head bolts.

In the incore chemical decontamination apparatus 110C described in the seventh embodiment, each ozone diffusion pipe 143 of the ozone gas supplying device 140 is installed inside the reactor pressure vessel 111 at a plurality of positions in the vertical direction, and the lower end side of the ozone diffusion pipe 143 is fixed to the upper shroud ring 150 so as to stably and accurately maintain the injection point of ozone gas.

In the upper part of the annulus portion 123, a highly fluctuating flow is generated by the stream of the downward flow formed as the upward flow ascending in the core shroud 116 is reversed and the jet stream of ozone gas jetted out from the end nozzle portions of the ozone diffusion pipe 143. However, since the top end portion of the ozone diffusion pipe 143 is fixed onto the upper shroud ring 150, the ozone diffusion pipe 143 can be stably retained and the ozone injection point can be accurately maintained.

Moreover, since the upper portion of the ozone diffusion pipe 143 is fixed onto the water supply sparger 145, the long stainless steel piping does not undergo excessive vibrations and the load applied on the joint portion between the ozone diffusion pipe 143 and the diffusion duct (ozone supply pipe) 142 can be reduced.

Furthermore, in the incore chemical decontamination apparatus 110C of the seventh embodiment, ozone gas can be supplied constantly, stably, and safely into the reactor pressure vessel 111, and the ozone water having a particular ozone concentration can be made to prevail and circulate in the entire reactor pressure vessel 111 interior and the entire recirculation piping 113 of the reactor recirculation system 112 outside the core. Thus, the oxide films on the internal structures and the reactor primary system such as the reactor recirculation system 112 and the like can be efficiently dissolved and oxidation treatment can be conducted.

Accordingly, by combining the oxidation process of dissolving the oxide films by supplying ozone gas into the reactor pressure vessel 111 from the ozone gas supplying means 140 with the reduction decontamination process using the decontamination agent before or after the oxidation process, the radioactivity can be removed except for the radioactivation of the reactor pressure vessel 111, the internal structures (core supporting plate 118, the core shroud 116, and the upper grid 119), and reactor primary system inside the recirculation piping 113 of the reactor recirculation system 112. As a result, the amount of radiation can be significantly reduced.

Eighth Embodiment

Figure 14:
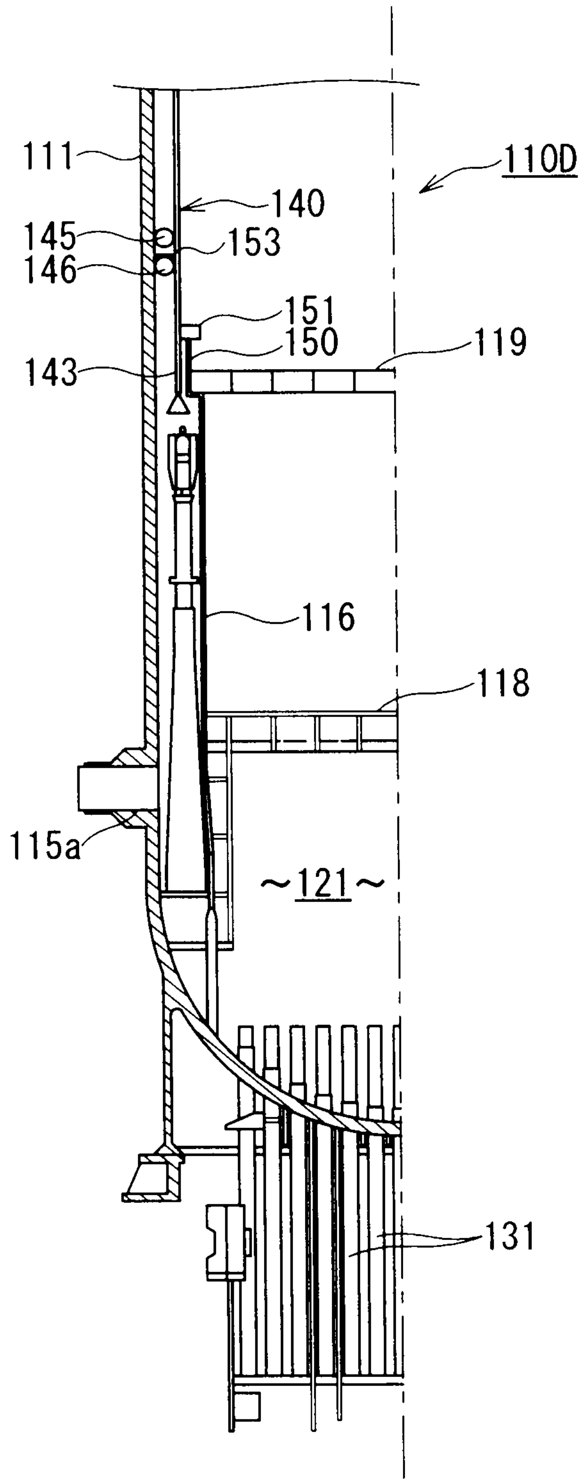
FIG. 14 A structural diagram showing an eighth embodiment of the incore chemical decontamination apparatus of the present invention.

FIG. 14 is a structural diagram showing an eighth embodiment of the incore chemical decontamination apparatus of the present invention.

This embodiment relates to installation of the ozone diffusion pipes 143 of the ozone gas supplying means (device) 140 in the reactor pressure vessel 111. Since other structures are identical to those of the incore chemical decontamination apparatus 110 described in the fourth embodiment, the same components are represented by the same reference numerals and duplicated descriptions thereof are simplified or omitted.

An incore chemical decontamination apparatus 110D shown in FIG. 14 has ozone diffusion pipes 143 of the ozone gas supplying means 140 suspended downward from an operation floor, not shown, so that the diffusion pipe heads are arranged to extend in a vertical direction while facing the upper portion of the annulus portion 123 formed between the reactor pressure vessel 111 and the core shroud 116. Each ozone diffusion pipe 143 is long SUS piping about several meters, e.g., about 6 m, in length, and the diffusion pipe upper end is positioned in the upper portion inside the reactor pressure vessel 111.

FIG. 14 is a vertical cross-sectional view showing a lower left half of the reactor pressure vessel 111. Each ozone diffusion pipe 143 arranged in a vertical direction in the reactor pressure vessel 111 is fixed to the reactor pressure vessel 111 at a plurality of positions in the vertical direction, e.g., at least two positions in the vertical direction. In the incore chemical decontamination apparatus 110D of the eighth embodiment, the portion of the ozone diffusion pipe 143 near the bottom end is fixed onto the upper shroud ring 150 with the clamping unit 151 and the portion near the top end is fixed onto the core spray piping 146 with a clamping unit 153.

In the case of fixing the lower portion of the ozone diffusion pipe 143 onto the upper shroud ring 150, a shroud head bolt bracket at the top portion of the core shroud 116 can be used.

By fixing the ozone diffusion pipe 143 of the ozone gas supplying means 140 onto the upper shroud ring 150, the ozone gas injection point can be accurately and stably maintained.

In the upper part of the annulus portion 123, the upstream flow ascending in the core shroud 116 is reversed and turns into a downstream flow, and a highly fluctuating flow is generated by the jet stream of ozone gas jet out from the end nozzle portion of the ozone diffusion pipe 143. However, since the end portion of the ozone diffusion pipe 143 is fixed to the upper shroud ring 150, the ozone diffusion pipe 143 can be stably retained and the ozone injection point can be accurately maintained.

Moreover, by fixing the upper portion of the ozone diffusion pipe 143 onto the core spray piping 146, the long stainless steel piping does not excessively vibrate and the load on the joint portion between the ozone diffusion pipe 143 and the diffusion duct (ozone supply pipe) 142 can be reduced. The ozone diffusion pipe 143 is arranged in an unused space along the circumferential direction in the reactor pressure vessel 111.

Furthermore, in the incore chemical decontamination apparatus 110D shown in FIG. 14, ozone gas can be supplied constantly, stably, and safely into the reactor pressure vessel 111, and the ozone water having a particular ozone concentration can prevail and circulate inside the entire reactor pressure vessel 111 and the entire reactor recirculation system 112 outside the core. Thus, the oxidation treatment, that can effectively dissolve the oxide films on the reactor pressure vessel 111, the internal structures, and the reactor primary system in the recirculation piping 113 of the reactor recirculation system 112, can be performed.

By combining the oxidation process for dissolving the oxide films by ozone gas and the reduction decontamination process using a decontamination agent before or after the oxidation process, the radioactivity can be removed except for the radioactivation of the interior of the reactor pressure vessel 111, the internal structures, and the recirculation piping 113 of the reactor recirculation system 112. As a result, the amount of radiation can be significantly reduced.

Ninth Embodiment

Figure 15:
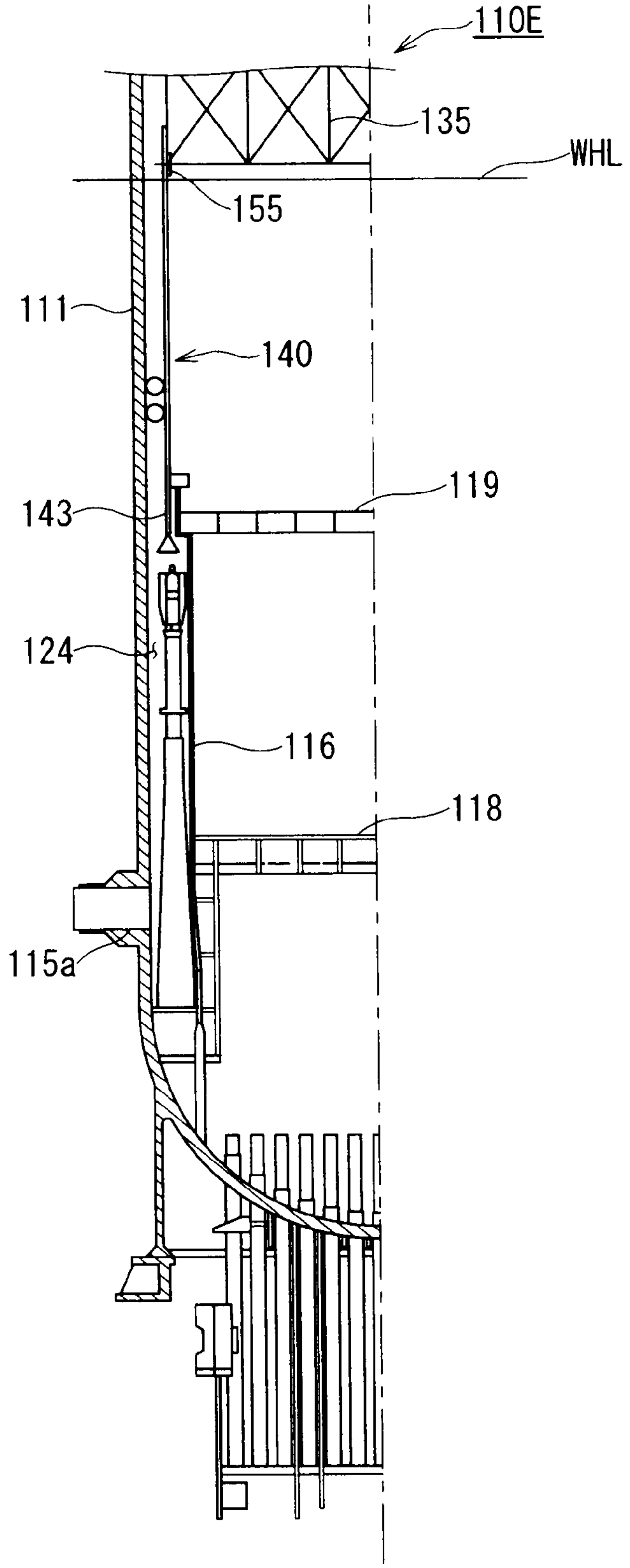
FIG. 15 A structural diagram showing a ninth embodiment of the incore chemical decontamination apparatus of the present invention.

FIG. 15 is a structural diagram showing a ninth embodiment of the incore chemical decontamination apparatus of the present invention.

This embodiment relates to installation of the ozone diffusion pipes 143 of the ozone gas supplying means 140. Since other structures are identical to those of the incore chemical decontamination apparatus 110 shown in FIG. 8, the same components are represented by the same reference numeral numbers and the duplicated descriptions are simplified or omitted herein. FIG. 15 shows an embodiment related to installation of the ozone diffusion pipes 143 in the reactor pressure vessel 111.

Each ozone diffusion pipe 143 of the ozone gas supplying means 140 is fixed to the interior of the reactor pressure vessel 111 at a plurality of positions in the vertical direction, e.g., at least two positions in the vertical direction. The ozone diffusion pipe 143 is disposed in an unused space in the reactor pressure vessel 111 so as to extend in the vertical direction in the reactor pressure vessel 111. The ozone diffusion pipe 143 is long stainless steel piping about several meters, e.g., about 6 m, in length. A plurality of ozone diffusion pipes 143, for example, 8 to 10 pipes, corresponding to the jet pump pairs disposed in the annulus portion 123 between the reactor pressure vessel 111 and the core shroud 116 are disposed.

The head (lower end) of each ozone diffusion pipe 143 is positioned in the upper portion of the annulus portion 123, and the upper end is positioned in the upper portion of the interior of the reactor pressure vessel 111. In an incore chemical decontamination apparatus 110E of the ninth embodiment, the portion of the ozone diffusion pipe 143 near the bottom end is fixed to the upper shroud ring 150 with the clamping unit 151 and the portion near the top end is fixed to a temporary spray ring 155 with a clamping unit 156.

The temporary spray ring 155 is disposed at a position that does not submerge at the maximum water level WHL at the time of the chemical decontamination. The ozone diffusion pipe 143 is fixed at a position higher than that in the fourth and fifth embodiments so that it is stable against the internal flow. In order to more securely fix the ozone diffusion pipe 143, the intermediate portion may be fixed to at least one of the water supply sparger 145 and the core spray piping 146, if necessary. In the case of fixing the lower end portion of the ozone diffusion pipe 143 to the upper shroud ring 150, a shroud head bolt bracket may also be used.

In the incore chemical decontamination apparatus 110E, since the lower end portion of the ozone diffusion pipe 143 of the ozone gas supplying means 140 is fixed to the upper shroud ring 150, the ozone gas injection point can be accurately maintained and stabilized.

By fixing the upper portion of the ozone diffusion pipe 143 onto the temporary spray ring 155, the long ozone diffusion pipe 143 does not excessively vibrate and the load applied to the joint portion between the ozone diffusion pipe 143 and the diffusion duct (ozone supply pipe 142) can be reduced.

The incore chemical decontamination apparatus 110E of the ninth embodiment can be applied to large-scale incore chemical decontamination of the reactor pressure vessel or the reactor recirculation system and can constantly stably supply ozone gas during the incore chemical decontamination operation. Ozone gas can be supplied from the ozone gas supplying means 140 to the interior of the reactor pressure vessel 111, and the ozone water having a particular ozone concentration can be prevailed and circulated in the entire reactor pressure vessel 111 and the reactor recirculation system 112 by operating the reactor recirculation system 112. Accordingly, the oxide films formed on the reactor pressure vessel 111, the internal structures, and the recirculation piping 113 of the reactor recirculation system 112 can be efficiently dissolved by oxidation treatment with the ozone water.

With the incore chemical decontamination apparatus 110E, by combining the reduction decontamination process using the decontamination agent before or after the oxidation process (oxidation treatment) with ozone water, the radioactivity can be removed except for the radioactivation of the interior of the reactor pressure vessel 111 and the reactor recirculation system 112, and the amount of radiation can be significantly reduced.

Although an example of applying the chemical decontamination apparatus using ozone mainly to a reactor pressure vessel and a reactor primary system of a boiling water reactor is described in the above-described embodiments, the present invention is applicable to a reactor vessel and a reactor primary system of a pressured water reactor, and to a decontamination apparatus for chemically dissolving radioactive substance-containing oxide films formed or adhering on the surfaces of the decontamination objects.

The invention claimed is:

1. An incore chemical decontamination apparatus operable for chemically decontaminating a decontamination object of a reactor primary system comprising:

a reactor primary system comprising a reactor interior that comprises a core, a core shroud, and a reactor pressure vessel, where a gap is present between the core shroud and the reactor pressure vessel, thereby forming an annulus portion;

a decontamination solution supplying device that supplies a decontamination solution to a reactor interior of the reactor primary system, the decontamination solution supplying device comprising a temporary decontamination solution spray ring present in an upper portion of an interior of the reactor pressure vessel;

an ozone supplying unit that injects ozone gas to the reactor interior of the reactor primary system;

an ozone water generating unit that generates ozone water with injected ozone gas, the ozone water generating unit comprising a jet pump present in an annulus portion between the reactor pressure vessel and a core shroud; and an ozone water circulating unit that circulates the generated ozone water in the reactor primary system through a reactor recirculation system, wherein the ozone supplying device comprises an ozone diffusion pipe for diffusing the ozone gas, the ozone diffusion pipe present at an inlet side of the ozone water generating unit.

2. The incore chemical decontamination apparatus according to claim 1, wherein the ozone diffusion pipe of the ozone supplying device comprises a plurality of ozone diffusion pipes present near and above a plurality of pairs of jet pumps present in an annulus portion between a reactor pressure vessel and a core shroud or near and above a space between pairs of jet pumps.

3. The incore chemical decontamination apparatus according to claim 2, wherein each ozone diffusion pipe of the ozone supplying device is a long pipe present in an upper portion inside a reactor pressure vessel so as to extend in a vertical direction, and the ozone supplying pipe is fixed to the inside of the reactor pressure vessel at a plurality of positions in the vertical direction.

4. The incore chemical decontamination apparatus according to claim 3, wherein the ozone diffusion pipe of the ozone supplying device has a lower end portion fixed to an upper shroud ring of the core shroud.

5. The incore chemical decontamination apparatus according to claim 3, wherein an upper portion of the ozone diffusion pipe of the ozone supplying device is fixed to a water supply sparger, core spray piping, or a decontamination solution spray ring.

6. The incore chemical decontamination apparatus according to claim 1, wherein said decontamination solution further comprises nitric acid and phosphoric acid or a phosphate, and the pH of the decontamination solution is 3 or less.

7. The incore chemical decontamination apparatus according to claim 1, wherein the ozone water generating unit comprises twelve jet pumps in six pairs to twenty jet pumps in ten pairs, which are present in an annulus portion between the reactor pressure vessel and a core shroud.

8. The incore chemical decontamination apparatus according to claim 1, wherein ozone is present in the ozone water in an amount of 1 ppm or more.

9. The incore chemical decontamination apparatus according to claim 1, wherein the annulus portion has a sleeve shape or a ring shape.

10. The incore chemical decontamination apparatus according to claim 1, wherein a metal oxide is present on a metallic surface of the apparatus, the metal oxide comprising iron oxide having at least one of Co-58 and Co-60 present therein.

11. The incore chemical decontamination apparatus according to claim 1, wherein the ozone diffusion pipe is about 1 meter from an upper edge of the core shroud.

12. The incore chemical decontamination apparatus according to claim 1, comprising a plurality of ozone diffusion pipes are present in a circumferential direction above the annulus near and above the jet pumps.

13. The incore chemical decontamination apparatus according to claim 1, wherein the reactor interior further comprises a core, a core supporting plate, an upper grid, a lower plenum and an upper plenum.

14. A method operable for chemically decontaminating a decontamination object of a reactor primary system comprising generating a flow of water in a reactor recirculation system of a reactor with a pump;

injecting ozone gas from an ozone diffusion pipe, present in an upper portion of a reactor internal annulus portion of the reactor, into the flow of water circulating in the reactor recirculation system to generate ozone water comprising dissolved ozone;

circulating a decontamination solution through a supplying device comprising a temporary decontamination solution spray ring that is present in an upper portion of an interior of a rector pressure vessel to obtain a decontamination solution;

contacting a film of a metal oxide comprising chromium adhering to a metallic surface of an object with the decontamination solution and a second solution comprising an organic acid as a reductant, thereby dissolving the oxide film having a high chromium content as an inner layer of the object to be decontaminated.

15. The method according to claim 14, further comprising injecting ozone gas from the ozone diffusion pipe into an upper portion of the annulus portion of the core shroud, wherein the ozone diffusion pipe is located near and above a plurality of jet pump pairs present in the annulus portion formed between the reactor pressure vessel and the core shroud or near and above gaps between jet pump pairs.

16. The method according to claim 14, wherein said decontamination solution further comprises nitric acid and phosphoric acid or a phosphate, and the pH of the decontamination solution is 3 or less.

17. The method according to claim 14, wherein said metal oxide comprises iron oxide having at least one of Co-58 and Co-60 present therein.

18. The method according to claim 14, wherein said organic acid comprises oxalic acid.

19. The method according to claim 14, wherein ozone is present in the ozone water in an amount of 1 ppm or more.

20. The method according to claim 14, wherein the metallic surface of an object having the metal oxide thereon is an outer peripheral wall of the core shroud and an inner peripheral wall of the reactor pressure vessel, which forms the annulus portion.

* * * * *